(12) United States Patent
Britton et al.

(10) Patent No.: US 11,325,633 B2
(45) Date of Patent: May 10, 2022

(54) PASSENGER TRANSPORT CARRIERS

(71) Applicant: Thule Sweden AB, Hillerstorp (SE)

(72) Inventors: Daniel William Britton, Calgary (CA);
Matthew Stengler, Calgary (CA);
Paramjit Singh, Calgary (CA)

(73) Assignee: Thule Sweden AB, Hillerstorp (SE)

( * ) Notice: Subject to any disclaimer, the term of this patent is extended or adjusted under 35 U.S.C. 154(b) by 402 days.

(21) Appl. No.: 16/399,556

(22) Filed: Apr. 30, 2019

(65) Prior Publication Data

US 2019/0256123 A1    Aug. 22, 2019

Related U.S. Application Data

(63) Continuation of application No. 15/529,442, filed as application No. PCT/IB2015/058986 on Nov. 19, 2015, now Pat. No. 10,328,965.

(Continued)

(51) Int. Cl.
*B62B 9/10* (2006.01)
*B62B 7/00* (2006.01)
*B62B 9/24* (2006.01)

(52) U.S. Cl.
CPC .............. *B62B 9/104* (2013.01); *B62B 7/008* (2013.01); *B62B 7/006* (2013.01); *B62B 9/24* (2013.01)

(58) Field of Classification Search
CPC ........... B62B 9/104; B62B 9/14; B62B 9/145; B62B 7/008
See application file for complete search history.

(56) References Cited

U.S. PATENT DOCUMENTS 1,663,149 A * 3/1928 Tryon ................ B62B 9/104
296/65.17
1,719,571 A * 7/1929 Stinson ............... B62B 9/104
296/66

(Continued)

FOREIGN PATENT DOCUMENTS

CA     1285300     6/1991
CN     2794961 Y   7/2006

(Continued)

OTHER PUBLICATIONS

Office Action for Chinese Application No. 201580064629.5, Chinese Patent Office, dated Aug. 30, 2018, 11 pages.

(Continued)

*Primary Examiner* — Katy M Ebner
(74) *Attorney, Agent, or Firm* — Sterne, Kessler, Goldstein & Fox P.L.L.C.

(57) ABSTRACT

A child transport carrier includes a lower frame, an upper frame, a rear frame, and a first upper seat support. The lower frame includes a first end and a second end. The upper frame includes a first end and a second end. The rear frame extends from the second end of the lower frame to the second end of the upper frame. The first upper seat support includes a cross-member extending transversely across the first upper seat support and having a first end and a second end. The cross-member is configured to move the first upper seat support between a first seat position and a second seat position. The upper frame extends from an upper end of the rear frame and the lower frame extends from a lower end of the rear frame.

18 Claims, 17 Drawing Sheets

Related U.S. Application Data

(60) Provisional application No. 62/084,992, filed on Nov. 26, 2014.

(56) References Cited

U.S. PATENT DOCUMENTS

| | | | | |
|---|---|---|---|---|
| 1,729,055 A * | 9/1929 | Specter | ...................... | B62B 9/26 296/37.4 |
| 1,758,895 A * | 5/1930 | Shaw | ...................... | B62B 9/104 296/63 |
| 4,089,543 A * | 5/1978 | Osborne | ................... | B62B 7/06 280/647 |
| 4,577,355 A * | 3/1986 | Kassai | ................... | B62B 9/104 5/93.1 |
| 5,240,265 A * | 8/1993 | Huang | ................... | B62B 9/104 280/47.4 |
| 5,246,272 A * | 9/1993 | Kato | ........................ | B62B 9/104 297/354.12 |
| 5,669,625 A * | 9/1997 | Jane Cabagnero | ....... | B62B 7/08 280/47.38 |
| 5,681,084 A * | 10/1997 | Yoneda | ................... | B62B 7/123 297/284.9 |
| 5,749,627 A * | 5/1998 | Perego | ................... | B62B 9/104 280/647 |
| 5,806,877 A * | 9/1998 | Huang | ................... | B62B 7/123 280/47.4 |
| 5,984,332 A | 11/1999 | Beaudoin et al. | | |
| 6,322,097 B1 * | 11/2001 | Lan | ........................... | B62B 7/08 280/47.4 |
| 6,530,591 B2 * | 3/2003 | Huang | ................... | B62B 7/123 280/47.38 |
| 6,676,140 B1 * | 1/2004 | Gondobintoro | ........... | B62B 7/08 280/33.993 |
| 6,830,254 B2 * | 12/2004 | Lan | ........................ | B62B 7/083 280/47.4 |
| 6,951,342 B2 * | 10/2005 | Lan | ........................... | B62B 7/08 280/47.38 |
| 8,070,180 B2 * | 12/2011 | Stiba | ....................... | B62B 3/027 280/648 |
| 8,172,322 B2 * | 5/2012 | Chen | ....................... | B62B 9/104 297/256.13 |
| 8,596,670 B2 * | 12/2013 | di Carimate | ............ | B62B 7/142 280/650 |
| 8,616,638 B2 * | 12/2013 | Zeng | ....................... | B62B 9/104 297/244 |
| 8,678,424 B2 | 3/2014 | Fleming et al. | | |
| 8,690,250 B2 * | 4/2014 | Zhen | ....................... | B62B 7/123 297/377 |
| 8,899,615 B2 * | 12/2014 | Dijkstra | .................. | B62B 9/087 280/658 |
| 8,991,929 B2 * | 3/2015 | Doucette | ................. | B62B 5/082 297/423.3 |
| 9,227,650 B2 * | 1/2016 | Gillett | ...................... | B62B 7/006 |
| 9,868,456 B2 * | 1/2018 | Stiba | ....................... | B62B 7/008 |
| D811,949 S * | 3/2018 | Stiba | ............................ | D12/129 |
| 2003/0132611 A1 * | 7/2003 | Yoshie | .................... | B62B 9/104 280/642 |
| 2004/0189076 A1 * | 9/2004 | Hanson | ................... | B62B 7/123 297/440.15 |
| 2005/0029855 A1 * | 2/2005 | Hanson | ................. | A61G 5/0891 297/440.15 |
| 2011/0156454 A1 | 6/2011 | Yi et al. | | |
| 2011/0175306 A1 * | 7/2011 | Newhard | ................ | B62B 9/104 280/47.4 |
| 2017/0247044 A1 * | 8/2017 | Wuerstl | .................. | A47D 15/00 |
| 2017/0361861 A1 * | 12/2017 | Britton | .................... | B62B 7/008 |
| 2019/0135323 A1 * | 5/2019 | Avigdor | .................... | B62B 9/20 |

FOREIGN PATENT DOCUMENTS

| | | | |
|---|---|---|---|
| CN | 2915623 Y | 6/2007 | |
| CN | 101362466 A | 2/2009 | |
| CN | 204368236 | 6/2015 | |
| DE | 202006012430 U1 | 10/2006 | |
| DE | 202012004462 U1 * | 7/2012 | .......... B62K 27/003 |
| EP | 1013198 A2 | 6/2000 | |
| EP | 2433846 A2 | 3/2012 | |
| GB | 2169793 | 7/1986 | |
| WO | WO 96/22907 A1 | 8/1996 | |

OTHER PUBLICATIONS

Search Report and Written Opinion for European Application No. 19163954.1, European Patent Office, dated Jul. 17, 2019, 6 pages.

Office Action for Canadian Application No. 2,969,079, Canadian Patent Office, dated Nov. 25, 2020, 4 pages.

Office Action for Canadian Application No. 2,969,079, Canadian Patent Office, dated Jun. 10, 2021, 3 pages.

International Search Report and Written Opinion of the International Searching Authority for International Appl. No. PCT/IB2015/058986, Canadian Intellectual Property Office, Gatineau, Quebec, Canada, dated Feb. 5, 2016, 6 pages.

Supplementary European Search Report and Written Opinion for European Appl. No. 15863251, European Patent Office, Munich, Germany, dated Dec. 20, 2017, 5 pages.

* cited by examiner

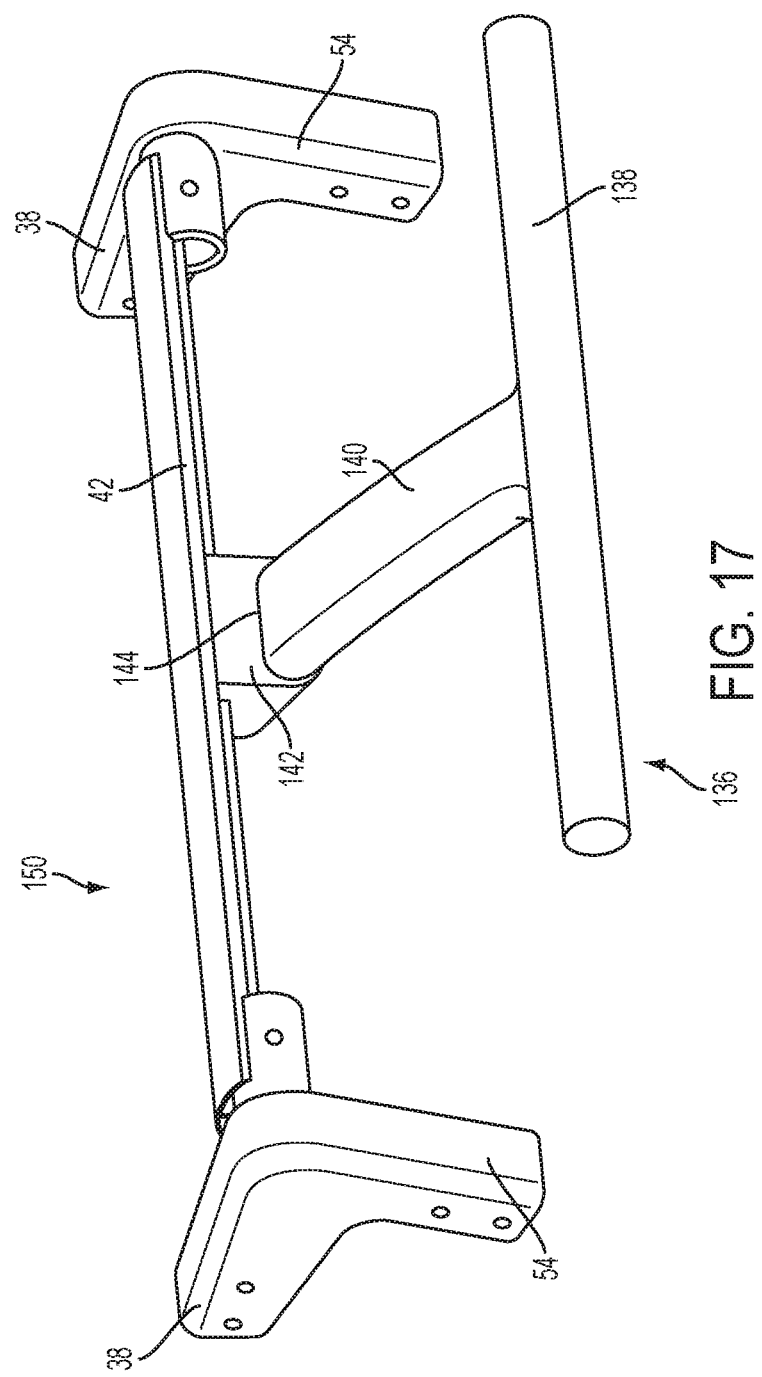

PASSENGER TRANSPORT CARRIERS

CROSS REFERENCE TO RELATED APPLICATIONS

This application is a continuation of U.S. application Ser. No. 15/529,442, filed May 24, 2017, which is a National Stage Entry of International Application No. PCT/IB2015/058986, filed Nov. 19, 2015, which claims priority to U.S. Provisional Application No. 62/084,992, filed Nov. 26, 2014, which are hereby incorporated herein in their entirety by reference.

BACKGROUND

Field

Embodiments of the present invention relate to passenger transport carriers.

Background

Passenger transport carriers carry a passenger, for example, a child, from one place to another. The passenger is supported by a seat in a passenger compartment of the carrier. The seat can include an adjustable seat back that orients the passenger at multiple positions, for example, at a position at which the passenger is sitting up and observing the environment and at a position at which the passenger is reclined or laying down to facilitate sleeping.

BRIEF SUMMARY

In some embodiments, a passenger transport carrier includes a lower frame having a first end and a second end, and an upper frame having a first channel defined therein, a first end, and a second end. The carrier also includes a rear frame extending from the second end of the lower frame to the second end of the upper frame. The carrier further includes a first upper seat support including a cross-member extending transversely across the carrier and having a first end and a second end, and a first elongate member extending from the first end of the cross-member of the first upper seat support and slidably received within the first channel of the upper frame. The first upper seat support is configured to move between a first seat position and a second seat position.

In some embodiments, the carrier also includes a first lock coupled to the first upper seat support and configured to lock the first upper seat support in the first seat position and in the second seat position. The first lock can be coupled to the first elongate member of the first upper seat support and slidably received within the first channel of the upper frame. The carrier can also include an actuator coupled to the first lock and configured to engage or disengage the first lock. The first lock can include a movable first locking pin, and the upper frame can define a first opening configured to receive the first locking pin when the first upper seat support is at the first seat position and a second opening configured to receive the first locking pin when the first upper seat support is at the second seat position. The first and second openings can extend entirely through a wall of the upper frame.

In some embodiments, the upper frame has a second channel defined therein, and the first upper seat support further includes a second elongate member extending from the second end of the cross-member of the first upper seat support and slidably received within the second channel of the upper frame. The carrier can also include a second lock coupled to the second elongate member of the first upper seat support, slidably received within the second channel of the upper frame, and configured to lock the first upper seat support in the first seat position and in the second seat position. The carrier can further include an actuator coupled to the first lock and to the second lock and configured to simultaneously engage or disengage the first lock and the second lock.

In some embodiments, the upper frame has a second channel defined therein, and the carrier includes a second upper seat support including a cross-member extending transversely across the carrier and having a first end and a second end, and a first elongate member extending from the first end of the cross-member of the second upper seat support and slidably received within the second channel of the upper frame. The second upper seat support is configured to move between a first seat position and a second seat position independent of the first upper seat support.

In some embodiments, the carrier also includes a seat configured to support a passenger and comprising a seat back coupled to the first upper seat support, and a seat bottom that remains stationary as the first upper seat support moves between the first seat position and the second seat position. In some embodiments, the first end of the upper frame is forward of the second end of the lower frame when the first upper seat support is at the first seat position and at the second seat position. In some embodiments, the carrier is configured to be used in at least two of the following modes: a bicycle mode; a ski mode; a walking mode; a hiking mode; and a jogging mode. In some embodiments, the carrier also includes a forward frame extending from the first end of the lower frame to the first end of the upper frame.

In some embodiments, a passenger transport carrier includes a frame having a first channel defined therein, a first end, and a second end. The carrier also includes a first seat support including a cross-member extending transversely across the carrier and having a first end and a second end, and a first elongate member extending from the first end of the cross-member of the first seat support and slidably received within the first channel of the frame. The first seat support is configured to move between a first seat position and a second seat position. The carrier also includes a first lock coupled to the first elongate member of the first seat support, slidably received within the first channel of the frame, and configured to lock the first seat support in the first seat position and in the second seat position.

In some embodiments, the carrier includes an actuator coupled to the first lock and configured to engage or disengage the first lock. The actuator can include a rotating lever and a cable coupled to the rotating lever at a first end of the cable and coupled to the first lock at a second end of the cable. The first lock can include a movable first locking pin. The frame can define a first opening configured to receive the first locking pin when the first seat support is at the first seat position and a second opening configured to receive the first locking pin when the first seat support is at the second seat position. The frame can have a second channel defined therein, and the first seat support can also include a second elongate member extending from the second end of the cross-member of the first seat support and slidably received within the second channel of the frame. The carrier can also include a second lock coupled to the second elongate member of the first seat support, slidably received within the second channel of the frame, and configured to lock the first seat support in the first seat position and in the second seat position. The carrier can include an actuator coupled to the first lock and to the second lock and configured to simultaneously engage or disengage the first lock and the second lock.

In some embodiments, the frame has a second channel defined therein, and the carrier includes a second seat support. The second seat support includes a cross-member extending transversely across the carrier and having a first end and a second end, and a first elongate member extending from the first end of the cross-member of the second seat support and slidably received within the second channel of the frame. The second seat support is configured to move between a first seat position and a second seat position independent of the first seat support.

In some embodiments, the carrier includes a seat configured to support a passenger and comprising a seat back coupled to the first seat support, and seat bottom that remains stationary as the first seat support moves between the first seat position and the second seat position.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

FIG. 17 is a partial rear perspective view of an upper frame portion and an upper seat support at a second, relaxed position according to an embodiment.

Figure 1:
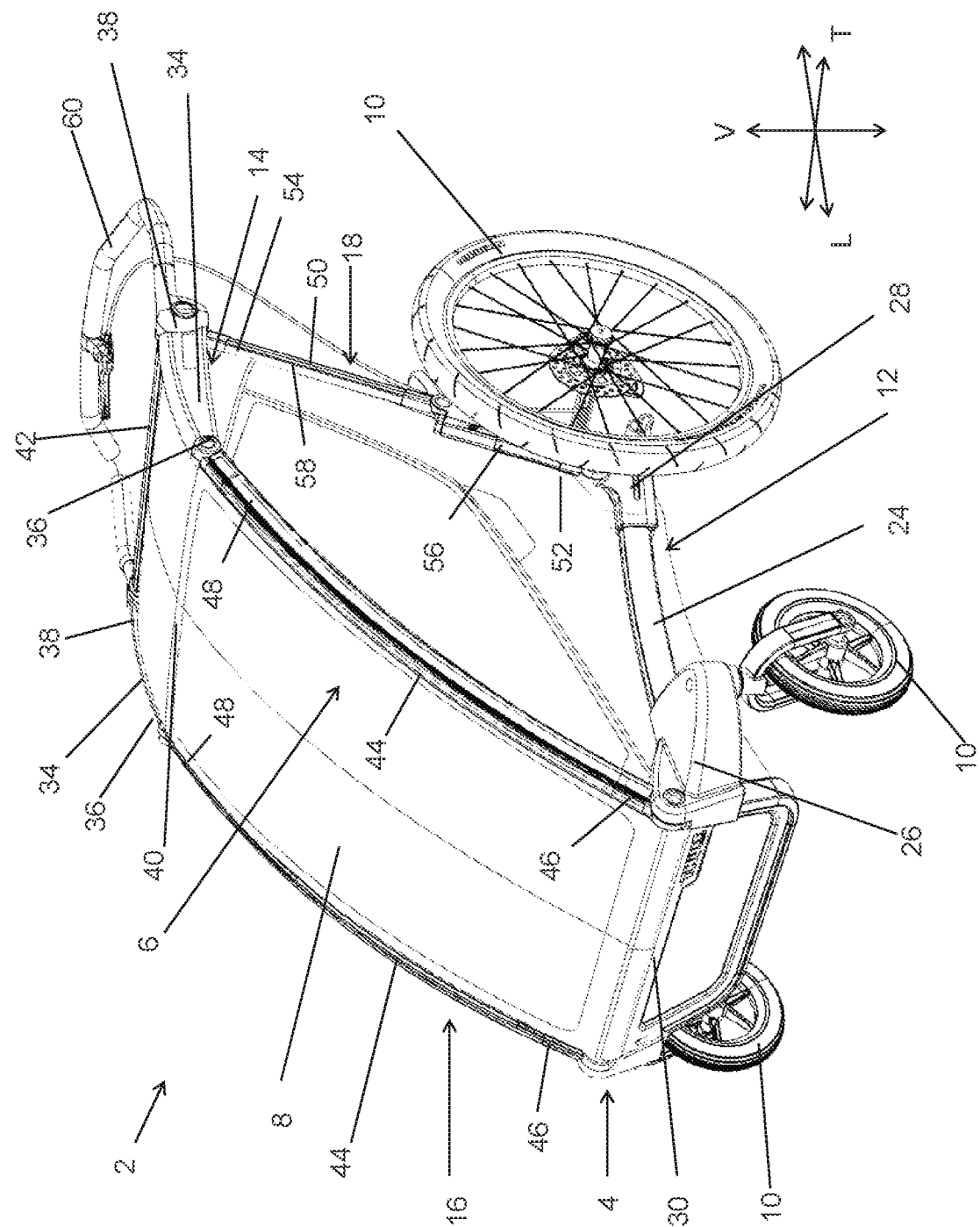
FIG. 1 is a front perspective view of a passenger transport carrier according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The present invention will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

FIGS. 1-11, 12A, 12B, 13A, and 13B illustrate a passenger transport carrier 2 according to an embodiment. Passenger transport carrier 2 is a device configured to carry a passenger from one place to another. The passenger can be, for example, child, a disabled person, or an elderly person. Carrier 2 can include a frame assembly that defines a passenger compartment configured to at least partially enclose a passenger. Carrier 2 can also include one or more transportation devices, for example, wheels, skis, or any other suitable transportation devices. The carrier can be configured to transport at least one passenger, for example, one, two, or three passengers.

Carrier 2 can be configured either for a single mode of operation (namely, a single-function carrier such as a simple stroller) or for multiple modes of operations (namely, a multi-function carrier). For example, a single-function carrier can be configured for one of the following modes of operation: a bicycle mode in which the carrier is pulled by a bicycle; a ski mode in which the carrier is either pulled by a skier; a walking mode in which the carrier is pushed by a user walking; a hiking mode in which the carrier is pulled by a user hiking; and a jogging mode in which the carrier is pushed by a user jogging. For example, a multi-function carrier can be configured to be used in at least two of the following modes: the bicycle mode; the ski mode; the walking mode; the hiking mode; and the jogging mode. In some multi-function embodiments, carrier 2 is configured such that the transportation devices, for example, wheels or skis, can be selectively and releasably coupled to the carrier. This way provides the user maximum flexibility by allowing the user to choose the mode.

Referencing FIG. 1, carrier 2 has a longitudinal axis L that is generally parallel to the intended direction of travel of the carrier, a transverse axis T that is generally perpendicular to longitudinal axis L, and a vertical axis V that is generally perpendicular to longitudinal axis L and transverse axis T. In this application, longitudinal and longitudinally, transverse and transversely, and vertical and vertically are relative to longitudinal axis L, transverse axis T, and vertical axis V, respectively.

In some embodiments, carrier 2 is configured to transport one passenger. In some embodiments, carrier 2 is configured to transport a child. In some embodiments, carrier 2 is configured to transport an adult disabled person or an elderly person.

Carrier 2 includes a frame assembly that provides structural support for carrier 2. FIGS. 1-4 and 6-8 illustrate a frame assembly 4 according to an embodiment. Frame assembly 4 defines a compartment 6 for containing a passenger. In some embodiments, as best seen in FIGS. 1-3, 6, and 7, frame assembly 4 completely surrounds compartment 6. Completely surrounding compartment 6 provides additional protection to a passenger seated within compartment 6, which can be advantageous for carriers configured for ski mode, bicycle mode, hiking mode, and jogging mode. In some embodiments (not shown FIGS. 1-3, 6, and 7), frame assembly 4 partially surrounds compartment 6 leaving, for example, the front, sides, and top of compartment 6 open.

Carrier 2 includes a cover 8 coupled to frame assembly 4. Cover 8 shields a passenger that is in compartment 6 from environmental elements, for example, sun, wind, rain, noise, or any other environmental element. In some embodiments, as best seen in FIGS. 1-3, 6, and 7, cover 8 completely surrounds compartment 6 to form a substantially enclosed passenger cabin. In some embodiments (not shown), cover 8 partially surrounds compartment 6 leaving, for example, the front, sides, or top of compartment 6 open. In some embodiments, cover 8 can be omitted.

Carrier 2 includes at least one transportation device. For example, as shown in FIGS. 1-3, 6, and 7, carrier 2 can include a plurality of wheels 10, for example, two, three, four, or more than four wheels. In some embodiments, carrier 2 can include non-wheel transportation devices, for example, skis or any other suitable transportation device.

In some embodiments, referencing collectively FIGS. 1-4 and 6-8, frame assembly 4 includes a lower frame 12 that defines a lower boundary of passenger compartment 6; an upper frame 14 that defines an upper boundary of passenger compartment 6; a forward frame 16 that defines a forward boundary of passenger compartment 6; and a rear frame 18 that defines a rear boundary of passenger compartment 6. In some embodiments, one or more of lower frame 12, upper frame 14, forward frame 16, and rear frame 18 can be omitted such that the corresponding boundary of compartment 6 is opened. For example, forward frame 16 can be omitted, in some embodiments, such that the front of compartment 6 is opened. Although as illustrated in FIGS. 1-3, 6, and 7, lower frame 12, upper frame 14, forward frame 16, and rear frame 18 are easily definable and discrete portions of frame assembly 4, two or more of lower frame 12, upper frame 14, forward frame 16, and rear frame 18 can be continuous, integral portions that define multiple boundaries of passenger compartment 6.

In some embodiments, referencing collectively FIGS. 1-4 and 6-8, lower frame 12 defines a terminal bottom edge of frame assembly 4; upper frame 14 defines a terminal top edge of frame assembly 4; forward frame 16 defines a terminal front edge of frame assembly 4; and rear frame 18 defines a terminal back edge of frame assembly 4. In other embodiments (not shown), one or more of lower frame 12, upper frame 14, forward frame 16, and rear frame 18 defines an intermediate portion, not a terminal edge of frame assembly 4.

Figure 4:
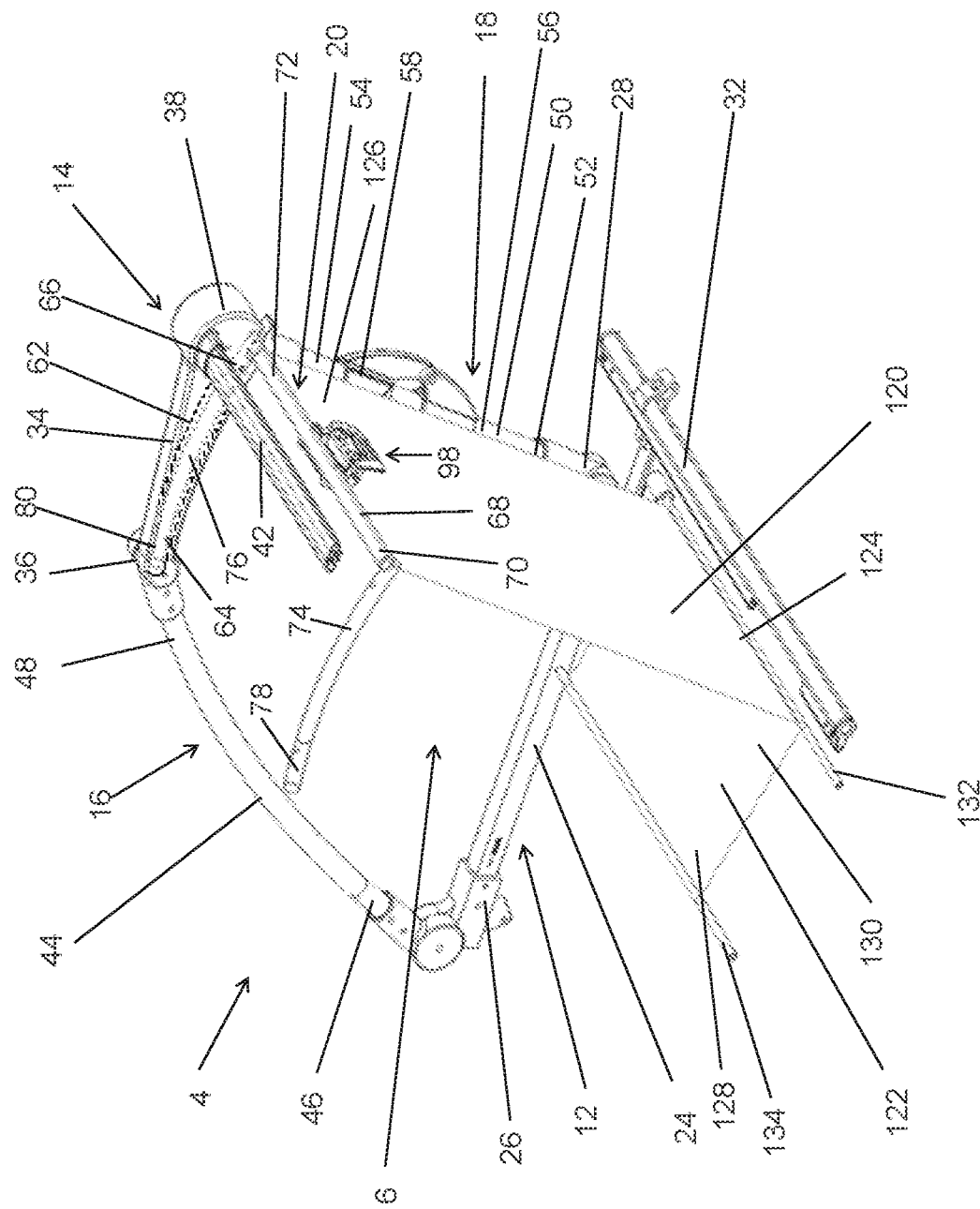
FIG. 4 is a partial rear perspective view of a frame assembly of a passenger transport carrier with an upper seat support at a first, upright position according to an embodiment.
Figure 5:
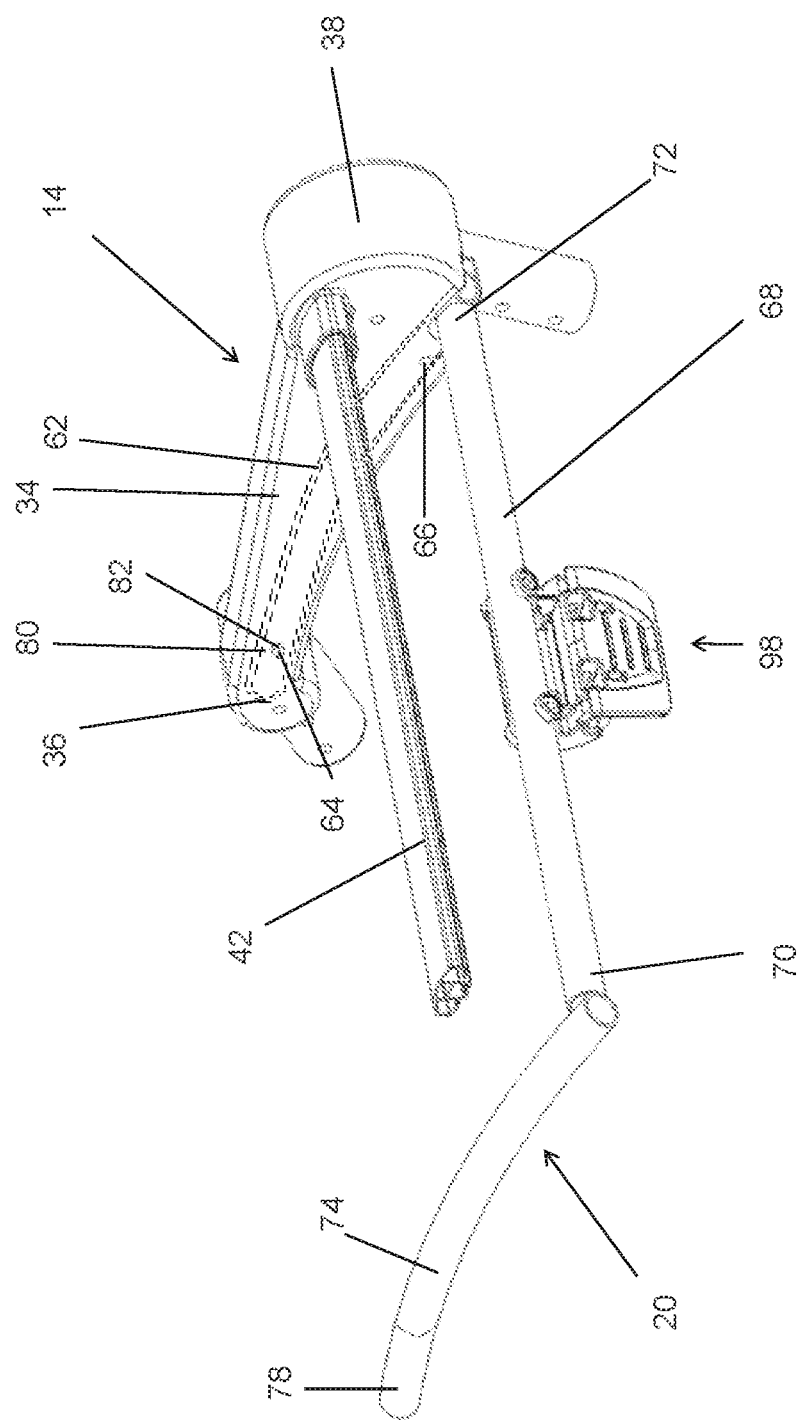
FIG. 5 is a partial rear perspective view of an upper frame portion and an upper seat support at a first, upright position according to an embodiment.
Figure 6:
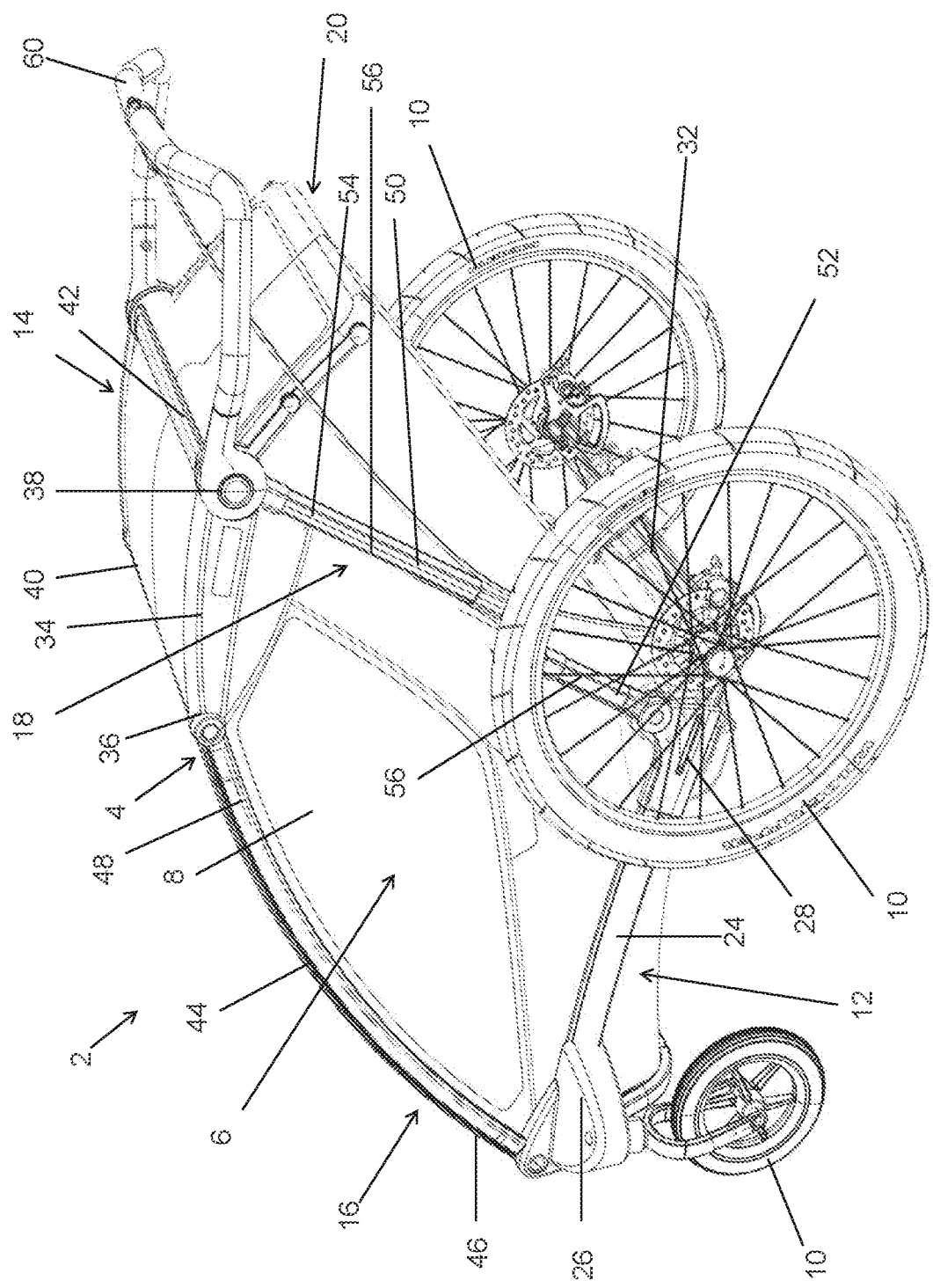
FIG. 6 is a rear perspective view of a passenger transport carrier with an upper seat support at a second, reclined position according to an embodiment.
Figure 7:
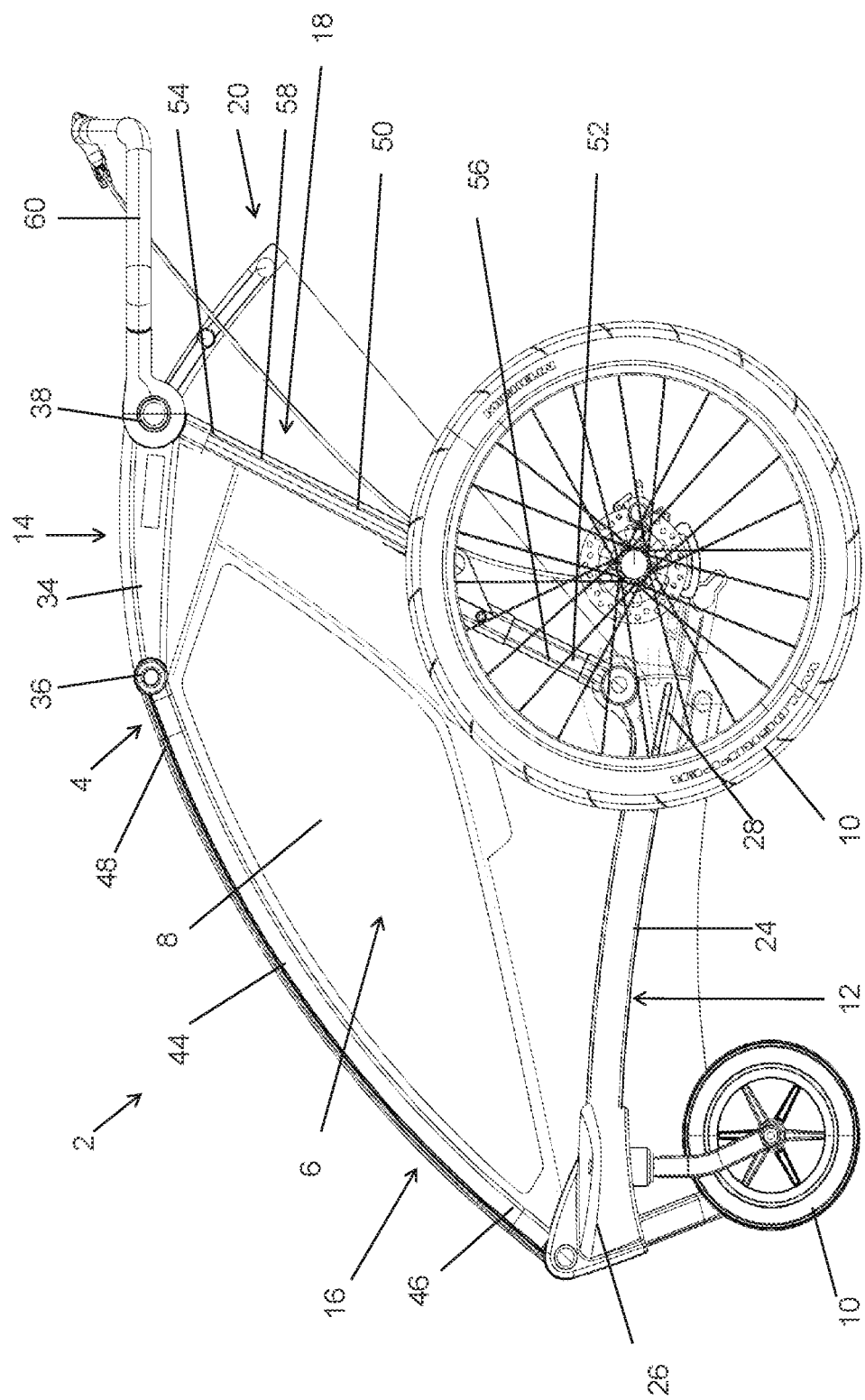
FIG. 7 is a side view of a passenger transport carrier with an upper seat support at a second, reclined position according to an embodiment.
Figure 8:
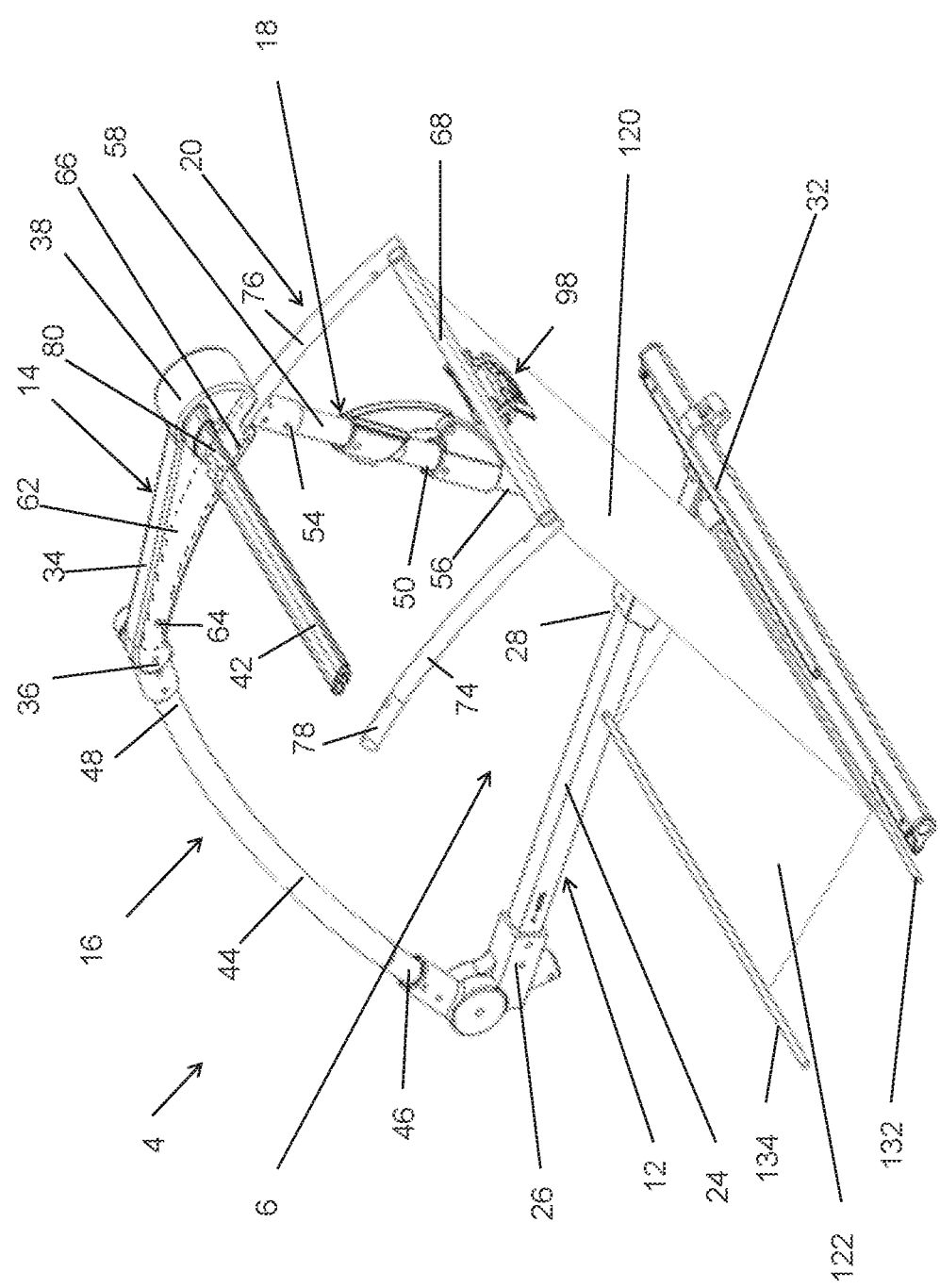
FIG. 8 is a partial rear perspective view of a frame assembly of a passenger transport carrier with an upper seat support at a second, reclined position according to an embodiment.

Lower frame 12 includes one or more frame members made of any suitable material, for example, metal, plastic, composite, or any other suitable material. For example, referencing FIGS. 1-4 and 6-8, lower frame 12 includes at least two spaced apart elongate lower frame members 24. (FIGS. 1-3, 6, and 7 illustrate a left elongate lower frame member 24, and FIGS. 4 and 8 illustrate a right elongate lower frame member 24.) Lower frame members 24 extend longitudinally across frame assembly 4 and, in some embodiments, are parallel to longitudinal axis L. Lower frame members 24 each have a forward end 26 and a rear end 28, which in some embodiments, define the forward end of frame assembly 4, and the rear end of frame assembly 4 as shown in FIGS. 1-4 and 6-8. As best seen in FIG. 1, lower frame 12 also includes a forward lower frame member 30 that extends transversely across lower frame 12 and is fixedly coupled to forward ends 26 of longitudinal lower frame members 24. As best seen in FIGS. 4, 6, and 8, lower frame 12 also includes rear lower frame member 32 that extends transversely across lower frame 12 and is fixedly coupled to rear ends 28 of longitudinal lower frame members 24. In some embodiments, lower frame 12 is rectangular when viewed from above in the vertical direction. In other embodiments, lower frame 12 has a non-rectangular shape when viewed from above in the vertical direction.

Figure 2:
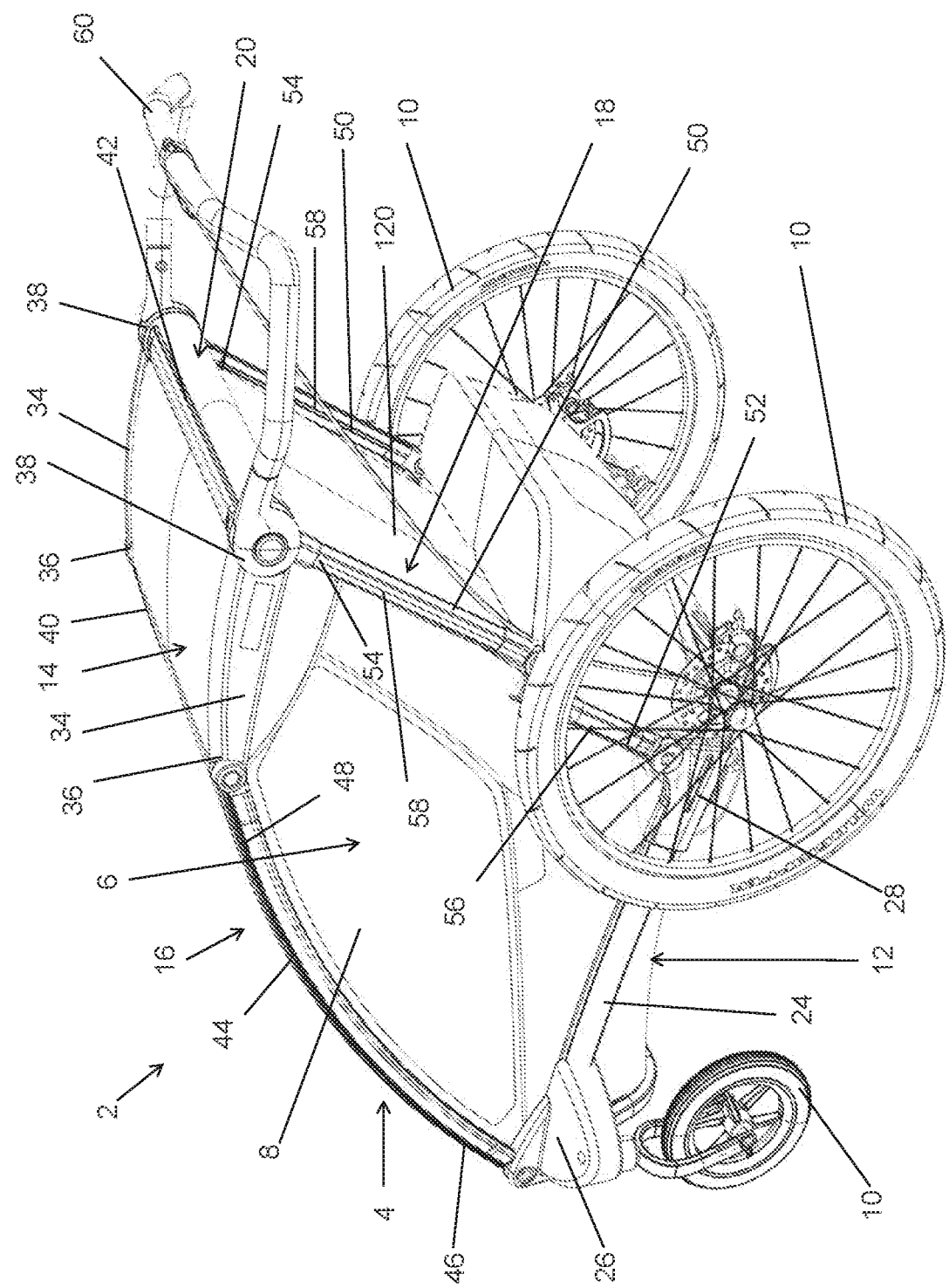
FIG. 2 is a rear perspective view of a passenger transport carrier with an upper seat support at a first, upright position according to an embodiment.
Figure 3:
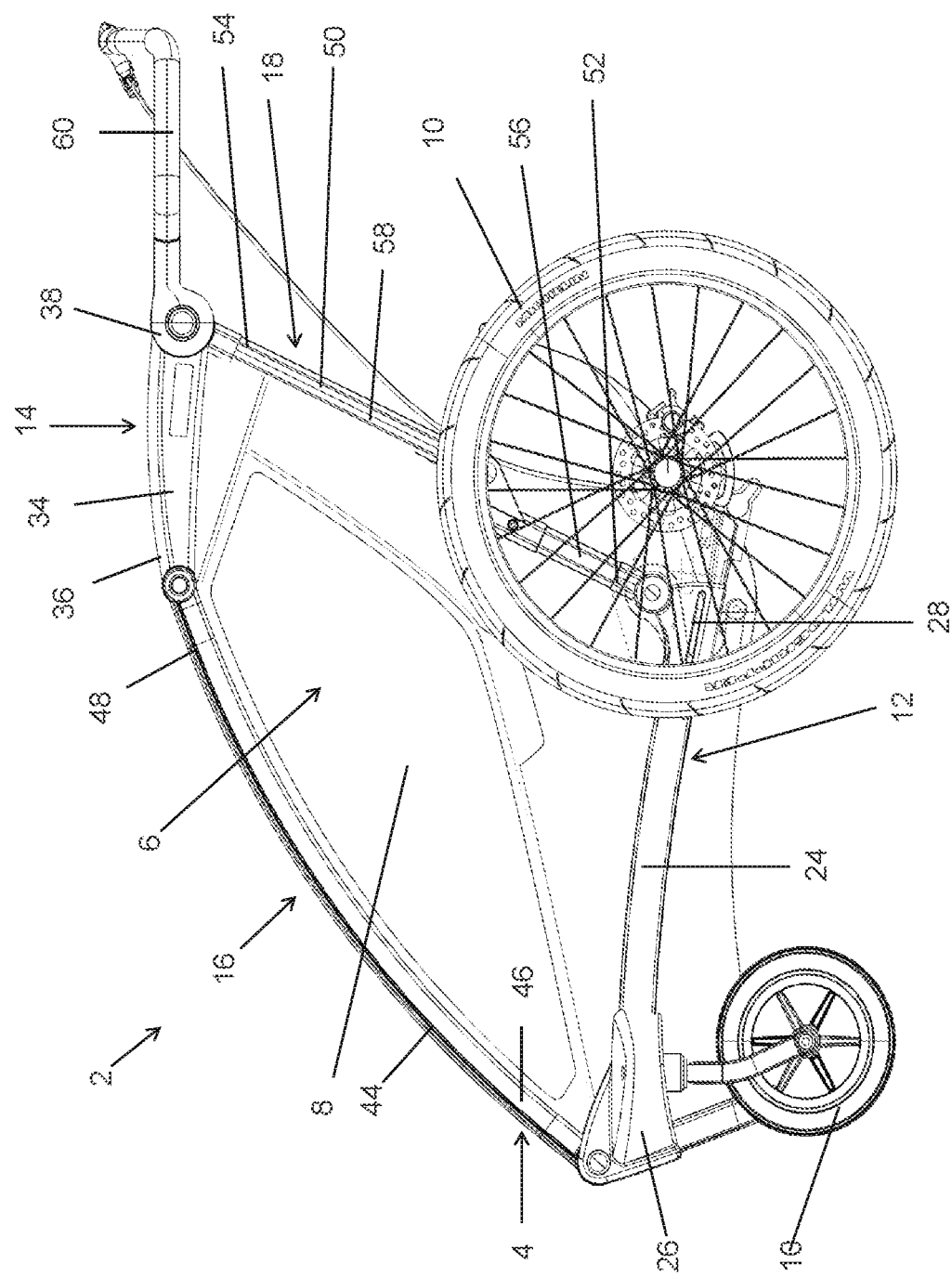
FIG. 3 is a side view of a passenger transport carrier with an upper seat support at a first, upright position according to an embodiment.

Upper frame 14 is positioned above lower frame 12. Upper frame 14 includes one or more frame members made of any suitable material, for example, metal, plastic, and composite. In some embodiments, referencing FIGS. 1-9 and 11, upper frame 14 includes at least two transversely spaced apart elongate upper frame members 34. For example, as shown in FIGS. 1-9 and 11, upper frame 14 includes a left upper frame member 34 on a left side of upper frame 14 and frame assembly 4, and a right upper frame member 34 on the right side of upper frame 14 and frame assembly 4. Upper frame members 34 extend longitudinally across upper frame 14 and, in some embodiments, are parallel to longitudinal axis L. Upper frame members 34 each have a forward end 36 and a rear end 38. As best seen in FIGS. 1, 2, and 6, upper frame 14 includes a forward upper frame member 40 that extends transversely across upper frame 14 and is fixedly coupled to forward ends 36 of longitudinal upper frame members 34. Upper frame 14 also includes rear frame member 42 that extends transversely across upper frame 14 and is fixedly coupled to rear ends 38 of longitudinal upper frame members 34 as best seen in FIGS. 1, 2, 4-6, 8, 9, and 11. In some embodiments, upper frame 14 is rectangular when viewed from above in the vertical direction. In other embodiments, upper frame 14 has a non-rectangular shape when viewed from above in the vertical direction.

In some embodiments, at least a portion of upper frame 14 overlaps lower frame 12 in a vertical direction. For example, forward ends 36 of upper frame members 34 of upper frame 14 are positioned in front of rear ends 28 of lower frame members 24 of lower frame 12. Accordingly, when a passenger is in compartment 6, at least a portion of the passenger will be vertically between upper frame 14 and lower frame 12. In some embodiments, at least a portion of upper frame 14 overlaps a seat bottom of a seat (which is described further below) that supports the passenger.

Forward frame 16 extends between lower frame 12 and upper frame 14. Forward frame 16 includes one or more members made of any suitable material, for example, metal, plastic, or composite. In some embodiments, referencing FIGS. 1-4 and 6-8, forward frame 16 includes at least two transversely spaced apart elongate forward frame members 44. For example, as shown in FIGS. 1-4 and 6-8, forward frame 16 includes a left forward frame member 44 on a left side of forward frame 16 and frame assembly 4, and a right forward frame member 44 on the right side of forward frame 16 and frame assembly 4. Frame members 44 extend in the vertical direction from lower frame 12 to upper frame 14 and, in some embodiments (not shown), are parallel to vertical axis V. Frame members 44 each have a lower end 46 and an upper end 48. Lower ends 46 are coupled, for example, fixedly or rotatably, to forward ends 26 of longitudinal lower frame members 24 of lower frame 12. Upper ends 48 are coupled, for example, fixedly or rotatably, to forward ends 36 of upper frame members 34 of upper frame 14. In some embodiments as shown, forward frame members 44 can be arcuate when viewed from the side. In some embodiments (not shown), forward frame members 44 are straight.

Rear frame 18 extends between lower frame 12 and upper frame 14. Rear frame 18 includes one or more frame members made of any suitable material, for example, metal, plastic, or composite. In some embodiments, referencing FIGS. 2-4 and 6-8, rear frame 18 includes at least two transversely spaced apart elongate rear frame members 50. For example, as shown in FIGS. 2-4 and 6-8, rear frame 18 includes a left rear frame member 50 on a left side of rear frame 18 and frame assembly 4, and a right rear frame member 50 on the right side of rear frame 18 and frame assembly 4. Rear frame members 50 extend in the vertical direction from lower frame 12 to upper frame 14 and, in some embodiments (not shown), are parallel to vertical axis V. Rear frame members 50 each have a lower end 52 and an upper end 54. Lower ends 52 are coupled, for example, fixedly or rotatably, to rear ends 28 of lower frame members 24 of lower frame 12. Upper ends 54 are coupled, for example, fixedly or rotatably, to rear ends 38 of upper frame members 34 of upper frame 14. In some embodiments, frame members 50 are straight. In some embodiments, frame members 50 include a hinge assembly such that a lower portion 56 of rear frame member 50 can rotate relative to an upper portion 58 of rear frame member 50.

In some embodiments, a frame member forming a portion of lower frame 12, upper frame 14, forward frame 16, or rear frame 18 can be the same member forming a portion of the other frame portions. For example, forward frame member 44 and longitudinal upper frame member 34 can be formed by the same frame member.

In some embodiments, referencing FIGS. 1-3, 6, and 7, frame assembly 4 also includes a handle 60 configured to be pushed or manipulated by a user to move carrier 2 in the direction of travel. Handle 60 includes ends coupled, rotatably or fixedly, to rear ends 38 of upper frame members 34 of upper frame 14 in some embodiments. Handle 60 can be substantially U-shaped when viewed from above in some embodiments.

Referencing FIGS. 2 and 4-11, frame assembly 4 also includes an upper seat support 20 that is movably coupled to upper frame 14 and configured to support a passenger seat. Upper seat support 20 is configured to move between a first seat position, for example, a terminal upright seat position, as shown in FIGS. 2-5 and 11, and a second seat position, for example, a terminal reclined seat position, as shown in FIGS. 6-9.

Referencing FIGS. 4, 5, 8, 9, 11, and 15, in some embodiments, upper seat support 20 includes a cross-member 68 that extends transversely across frame assembly 4 and carrier 2. Cross-member 68 is positioned to be accessible to a user's hand so that a user can grab cross-member 68 and move upper seat support 20 between the first seat position and the second seat position. Cross-member 68 has a first end 70 and a second end 72. Upper seat support 20 also includes a first elongate member 74 that extends longitudinally from first end 70 of cross-member 68 toward the front end of frame assembly 4. Upper seat support 20 also includes a second elongate member 76 that extends longitudinally from second end 72 of cross-member 68 toward the front end of frame assembly 4. In some embodiments, elongate members 74 and 76 are arcuate when viewed from the side. Collectively, when viewed from above in the vertical direction, elongate members 74 and 76 and cross-member 68 form a U-shape. In other embodiments, elongate members 74 and 76 and cross-member 68 can form a non-U-shape.

Referencing FIGS. 4 and 8, upper frame members 34 of upper frame 14 can each define a channel 62. In some embodiments, channels 62 each have an opening at rear end 38 of upper frame member 34, and channel 62 has a closed end at forward end 36 of upper frame member 34. In some embodiments, channels 62 have open ends at forward ends 36 of upper frame members 34.

In some embodiments, upper frame member 34 is a plastic housing made of two combinable halves that collectively define channel 62. In some embodiments, at least a portion of channel 62 overlaps lower frame 12 in the vertical direction. For example, the closed ends of channel 62 can be positioned in front of rear ends 28 of lower frame members 24 of lower frame 12.

Each upper frame member 34 further defines a forward opening 64 in communication with channel 62 and a spaced rear opening 66 in communication with channel 62. As explained further below, forward openings 64 and rear openings 66 correspond to the first seat position and the second seat position, respectively, and operatively stop and lock upper seat support 20 at the first seat position and the second seat position. In some embodiments, openings 64 and 66 are through holes that extend through the entire wall of upper frame member 34 from channel 62 to the outer surface of upper frame member 34 as shown, for example, in FIGS. 4, 5, 8, and 9. In other embodiments, openings 64 and 66 are recesses defined in the internal surface that defines channel 62. In some embodiments, forward openings 64 are at forward ends 36 of upper frame members 34, and rear openings 64 are at rear ends 38 of upper frame members 34. In some embodiments, frame members 34 defines one or more openings aligned between forward openings 64 and rear openings 66 that corresponds to one or more additional seat positions of upper seat support 20.

Figure 9:
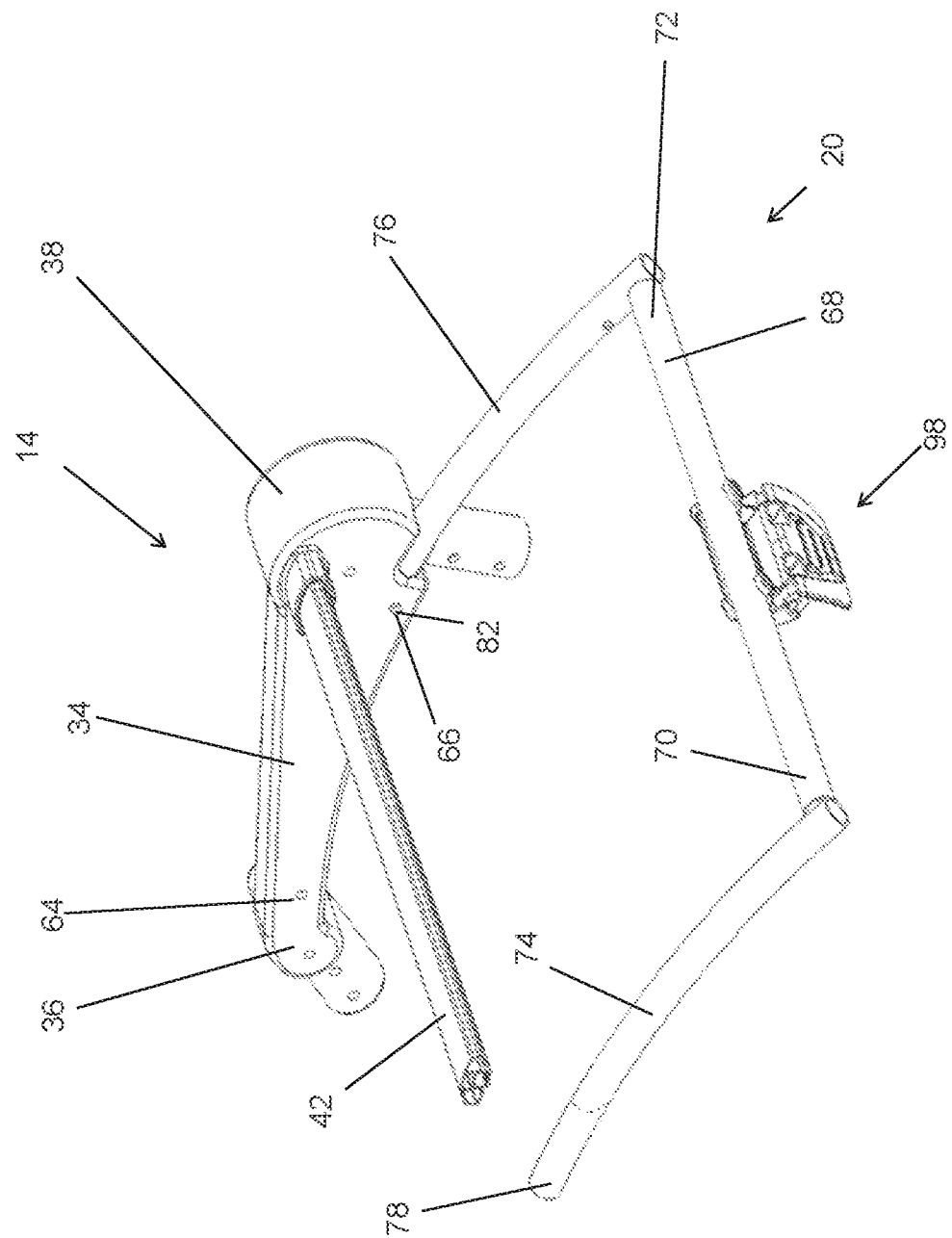
FIG. 9 is a partial rear perspective view of an upper frame portion and an upper seat support at a second, reclined position according to an embodiment.
Figure 10:
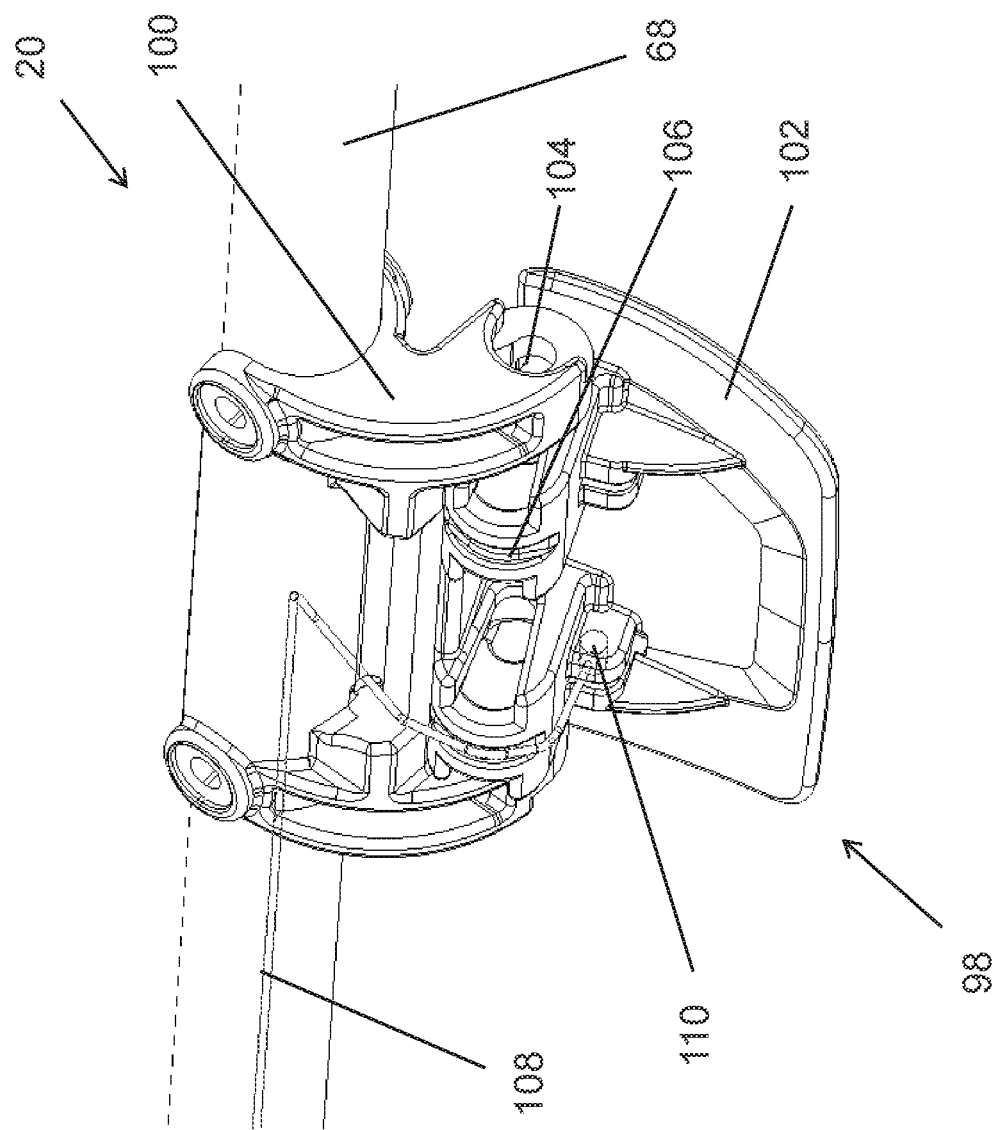
FIG. 10 is a partial rear perspective view of an actuator according to an embodiment.
Figure 11:
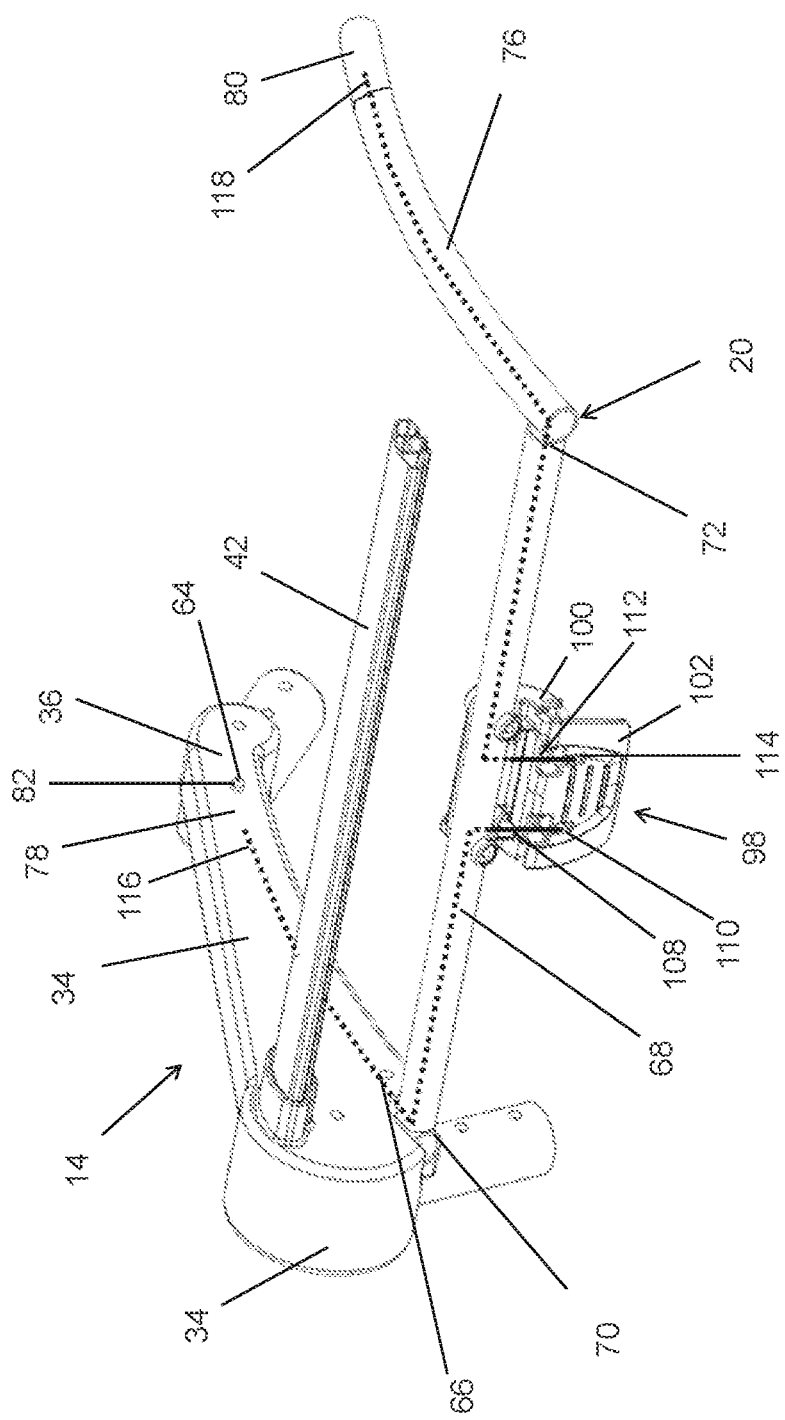
FIG. 11 is a partial rear perspective view of an upper frame portion, an upper seat support at a first, upright position, and an actuator according to an embodiment.

Channels 62 defined by upper frame members 34 are configured to closely receive elongate members 74 and 76 therein in some embodiments. Elongate members 74 and 76 slide within channels 62 as upper seat support 20 moves relative to upper frame members 34 between the first seat position and the second seat position. For example, in FIGS. 4 and 5 (in which the left upper frame member 34 is removed for illustrative purposes), upper seat support 20 is at the first seat position. At this first seat position, substantially the entire lengths of elongate members 74 and 76 are within channels 62 defined by upper frame members 34. In FIGS. 8 and 9, (in which the left upper frame member 34 is removed for illustrative purposes), upper seat support 20 is at the second seat position. At this second position, substantial portions of the lengths of elongate members 74 and 76 are outside of channels 62 while the distal ends of elongate members 74 and 76 remain within the channels 62 in some embodiments. This configuration can improve the aesthetics of carrier 2 because the moving components of upper seat support 20 are concealed within channels 62 of upper frame members 34. This configuration can also help reduce the risk of pinching because the moving components upper seat support 20 are concealed within channels 62 of upper frame members 34 and because there are no small openings that decrease in size (while upper seat support 20 moves) in which a user or passenger may be pinched or where an article of clothing or other object may get caught. In some embodiments, elongate members 74 and 76 include a stop that prevents elongate members 74 and 76 from coming out of channels 62.

In some embodiments, carrier 2 also includes at least one lock configured to lock upper seat support 20 at the first seat position and at the second seat position. In some embodiments, the at least one lock configured to lock upper seat support 20 at discrete positions. In some embodiments, a lock is coupled to one of elongate member 74 and elongate member 76, and configured to be slidably received within a respective channel 62 defined by one of upper frame members 34. In some embodiments, referencing FIGS. 4, 5, 8, and 9, carrier 2 includes a first lock 78 coupled to the distal end of elongate member 74 of upper seat support 20, and a second lock 80 coupled to the distal end of elongate member 76 of upper seat support 20. First lock 78 and second lock 80 are configured to slide within respective channels 62 of upper frame 14. First lock 78 and second lock 80 are configured collectively to lock upper seat support 20 at the first seat position and at the second seat position.

FIGS. 12A, 12B, 13A, and 13B, illustrate an embodiment of first lock 78 and second lock 80. Lock 78 or 80 includes a movable locking pin 82 configured to move between (1) a first engaged pin position that locks upper seat support 20 at the first seat position or at the second seat position, and (2) a second disengaged pin position that unlocks upper seat support 20 allowing upper seat support 20 to move between the first seat position and the second seat position. Lock 78 or 80 can be configured to be inserted within, for example, at the distal ends, of elongate members 74 and 76 (shown in FIGS. 12A, 12B, 13A, and 13B), or to be abutted against the distal ends of elongate members 74 and 76 (not shown).

In some embodiments in which lock 78 or 80 is inserted within elongate members 74 and 76, lock 78 or 80 also includes a housing 84 shaped to closely match the shape of a channel defined by elongate members 74 and 76. For example, if the channels defined by elongate members 74 and 76 have a cylindrical shape, housing 84 has a corresponding cylindrical shape that matches the channel of elongate members 74 and 76 as shown, for example, in FIGS. 12A and 12B. Accordingly, housing 84 is configured to be received within elongate members 74 and 76 and, thus, slide within channel 62 of frame members 34 as upper seat support 20 moves between the first seat position and the second seat position. Housing 84 defines a channel 86 that extends longitudinally across housing 84 and then transversely to create a periphery opening in housing 84. Locking pin 82 is slidably coupled within channel 86 such that at the first engaged pin position (FIGS. 12A and 13A) the distal end of locking pin 82 extends beyond housing 84 and at the second disengaged pin position (FIGS. 12B and 13B) the distal end of locking pin 82 is retracted within housing 84.

Lock 78 or 80 also includes a sliding member 88 slidably disposed within channel 86 of housing 84. In some embodiments, sliding member 88 is configured to slide in a direction perpendicular to the movement of locking pin 82. Locking pin 82 defines a slot 90 that is angled relative to the direction of travel of sliding member 88. Sliding member 88 includes a pin 92 position within slot 90 defined by locking pin 82. As sliding member 88 is moved away from locking pin 82, pin 92 engages slot 90 to retract locking pin 82 within housing 84 of lock 78 or 80 to the second disengaged pin position. Lock 78 or 80 also includes a compression spring 94 that biases locking pin 82 towards the first engaged pin position. Accordingly, as sliding member 88 moves toward locking pin 82, pin 92 disengages slot 90, and locking pin 82 moves towards the first engaged pin position such that the distal end of locking pin 82 extends beyond housing 84.

Figure 12A:
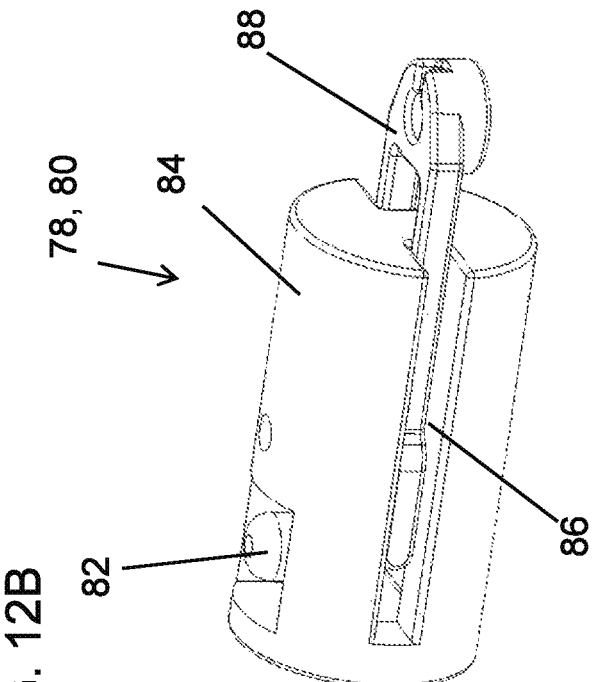
FIGS. 12A and 12B are perspective views of a lock at a first locked position and at a second, unlocked position, respectively.
Figure 12B:
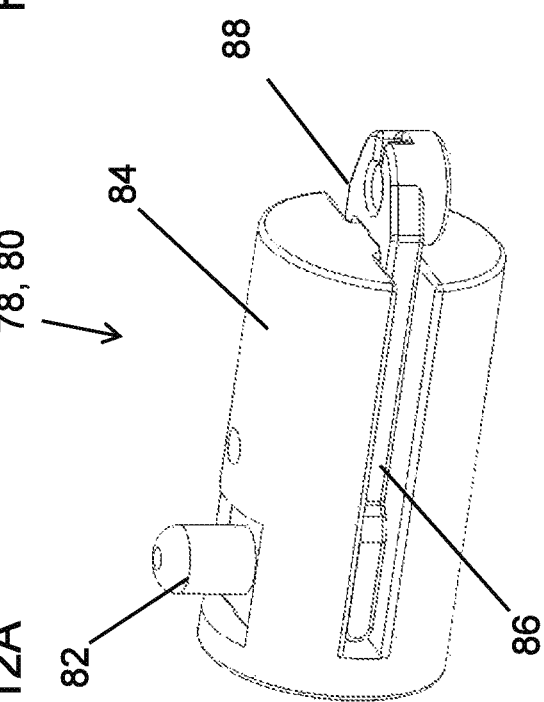
Figure 13A:
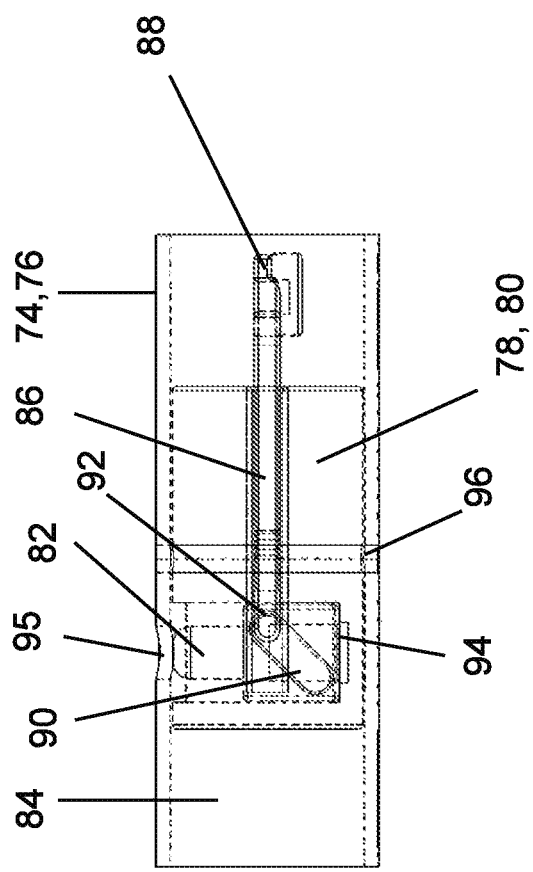
FIGS. 13A and 13B are cross-sectional views of a lock at a first locked position and at a second, unlocked position, respectively.
Figure 13B:
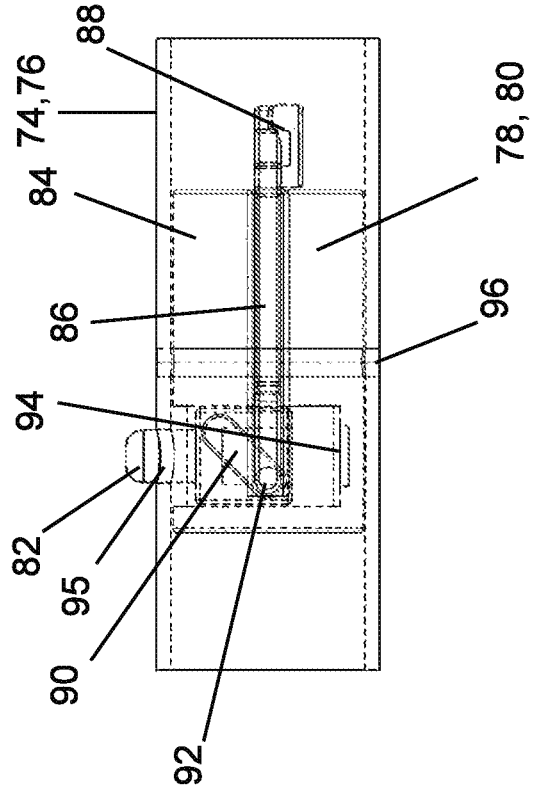

In some embodiments in which lock 78 or 80 is inserted within elongate members 74 and 76, elongate members 74 and 76 define an opening 95, for example, at their distal ends, as shown in FIGS. 13A and 13B. Opening 95 allows the distal end of locking pin 82 to extend through the wall of elongate members 74 and 76 when locking pin 82 is at the first engaged pin position as shown in FIGS. 12A and 13A. Lock 78, 80 fixedly coupled to elongate members 74 and 76 using a dowel pin 96 that extends through the wall of elongate members 74 and 76 and housing 84.

Turning to the operative cooperation of locks 78 and 80 and upper frame members 34 according to an embodiment, the distal end of locking pin 82 is configured to be received in the openings 64 and 64 defined by upper frame member 34 to lock upper seat support 20. For example, upper frame 14, upper seat support 20, and lock 78 or 80 are configured such that the distal end of locking pin 82 is received in opening 64 when upper seat support 20 is at the first seat position and when and locking pin 82 is at the first engaged pin position. Upper seat support 20 is locked at the first seat position at this configuration. Accordingly, the cooperation between opening 64 and locking pin 82 may also operate as a stop that prevents elongate members 74 and 76 of upper seat support 20 from moving in a forward longitudinal direction within channels 62 defined by upper frame members 34.

Upper frame 14, upper seat support 20, and lock 78 or 80 are also configured such that the distal end of locking pin 82 is received in opening 66 when upper seat support 20 is at the second seat position and when and locking pin 82 is at the first engaged pin position. Upper seat support 20 is locked at the second seat position at this configuration. Accordingly, the cooperation between opening 66 and locking pin 82 may also operate as a stop that prevents elongate members 74 and 76 of upper seat support 20 from coming out of channels 62 defined by upper frame members 34.

To unlock upper seat support 20 at either the first or second seat position, locking pin 82 is moved to the second disengaged pin position at which the distal pin is no longer received within either opening 64 or opening 66.

Referencing FIGS. 4, 5 and 8-11, carrier 2 can also include at least one actuator 98 coupled to first lock 78 and second lock 80 that is configured to engage and/or disengage first lock 78 and second lock 80 (for example, configured to move locking pin 82 between the first engaged pin position and the second disengaged pin position). Referencing FIGS. 10 and 11 which illustrate actuator 98 according to an embodiment, actuator 98 includes a base 100 fixedly coupled to carrier 2, for example, to cross-member 68 of upper seat support 20.

In some embodiments, actuator 98 is positioned, for example, at cross-member 68, such that a user can access actuator 98 to lock or unlock upper seat support 20 from the upper, rear of carrier 2. This position provides the user access to actuator 98 while standing in the normal operation position when being used in a walking or jogging mode. That is, the user can access actuator 98 with bending down or moving to the front of carrier 2. This position may also allow the user to easily assist with manually moving upper seat support 20.

Actuator 98 also includes a lever 102 rotatably coupled to base 100 using a pivot pin 104. Lever 102 rotates between a first lever position, for example, at which the distal end of lever 102 is pointed up (not shown), and a second lever position at which the distal end of lever 102 is pointed down as shown in FIGS. 4, 5 and 8-11. Actuator 98 includes a spring 106 configured to bias lever 102 towards the first lever position. Actuator 98 also includes a first cable 108 having a first end 110 fixedly coupled to lever 102. First cable 108 is fed within the channels defined by cross-member 68 and first elongate member 74 to first lock 78. The other end 116 of first cable 108 is coupled to first lock 78, for example, directly to sliding member 88. Actuator 98 also includes a second cable 112 (shown in FIG. 11) having a first end 114 fixedly coupled to lever 102. Second cable 112 is fed within the channels defined by cross-member 68 and second elongate member 76 to second lock 80. The other end 118 of second cable 112 is coupled to second lock 80, for example, directly to sliding member 88. As lever 102 rotates between the first lever position and the second lever position, lever 102 pulls first cable 108 and second cable 112, which in turn pulls sliding member 88 of first lock 78 and sliding member 88 of second lock 80, respectively. As sliding members 88 of first and second locks 78 and 80 are pulled, the locking pin 82 moves from the first engaged pin position to the second disengaged pin position. Accordingly, a single actuator 98 is configured to simultaneously disengage first lock 78 and second lock 80. In other embodiments (not shown), instead of having a single actuator 98 that simultaneously engages and/or disengages first lock 78 and second lock 80, carrier 2 can have two separate actuators 98 that independently operate first lock 78 and second lock 80. In some embodiments, instead of using two separate cables 108 and 112, actuator 98 includes a single cable that is coupled to first lock 78 and second lock 80 at the ends of the cable and to lever 102 at an intermediate portion of the cable.

Referencing FIGS. 2, 4, and 8, carrier 2 can also include a seat configured to support a passenger within compartment 6. The seat can include a seat back 120 and a seat bottom 122 in some embodiments. Seat back 120 is configured to support the back of the passenger within compartment 6, and seat bottom 122 is configured to support the bottom of the passenger within compartment 6. Seat back 120 includes a lower end 124 and an upper end 126. Upper end 126 of seat back 120 is coupled to upper seat support 20. For example, upper end 126 of seat back 120 can be wrapped around cross-member 68 of upper seat support 20. Lower end 124 of seat back 120 is coupled to frame assembly 4. For example, in some embodiments, lower frame 12 includes a rear lower frame member 132 extending transversely across lower frame 12 and fixedly coupled to longitudinal lower frame members 24, and lower end 124 of seat back 120 is coupled to rear lower frame member 132. Accordingly, as upper seat support 20 moves between the first seat position and the second seat position, seat back 120 rotates about a transverse axis defined by rear lower frame member 132 to which lower end 124 of seat back 120 is coupled.

In some embodiments, seat back 120 is only coupled to upper seat support 20 and rear lower frame member 132. That is, no frame members, including vertically extending frame members, are coupled to seat back 120 between upper seat support 20 and rear lower frame member 132. This configuration may allow carrier 2, including seat back 120, to be easily folded. This configuration may also help reduce the weight and cost of manufacturing carrier 2.

Seat bottom 122 includes a forward end 128 and a rear end 130. Forward end 128 of seat bottom 122 and rear end 130 of seat bottom 122 are coupled to frame assembly 4. For example, in some embodiments, lower frame 12 includes a forward lower frame member 134 extending transversely across lower frame 12 and fixedly coupled to longitudinal lower frame members 24. Forward end 128 of seat bottom 122 is coupled to forward lower frame member 134, and rear end 130 of seat bottom 122 is fixedly coupled to rear lower frame member 132. Accordingly, as seat back 120 rotates between the first seat position and the second seat position, seat bottom 122 remains stationary. Because seat bottom 122 remains stationary, the leg room for a passenger's legs does not change between the first seat position and the second seat position.

In some embodiments, seat back 120 and seat bottom 122 are made of a flexible material or any other suitable material. In some embodiments, seat back 120 and seat bottom 122 are formed from separate panels of material. In some embodiments, seat back 120 and seat bottom 122 are formed from a single panel of material.

Figure 14:
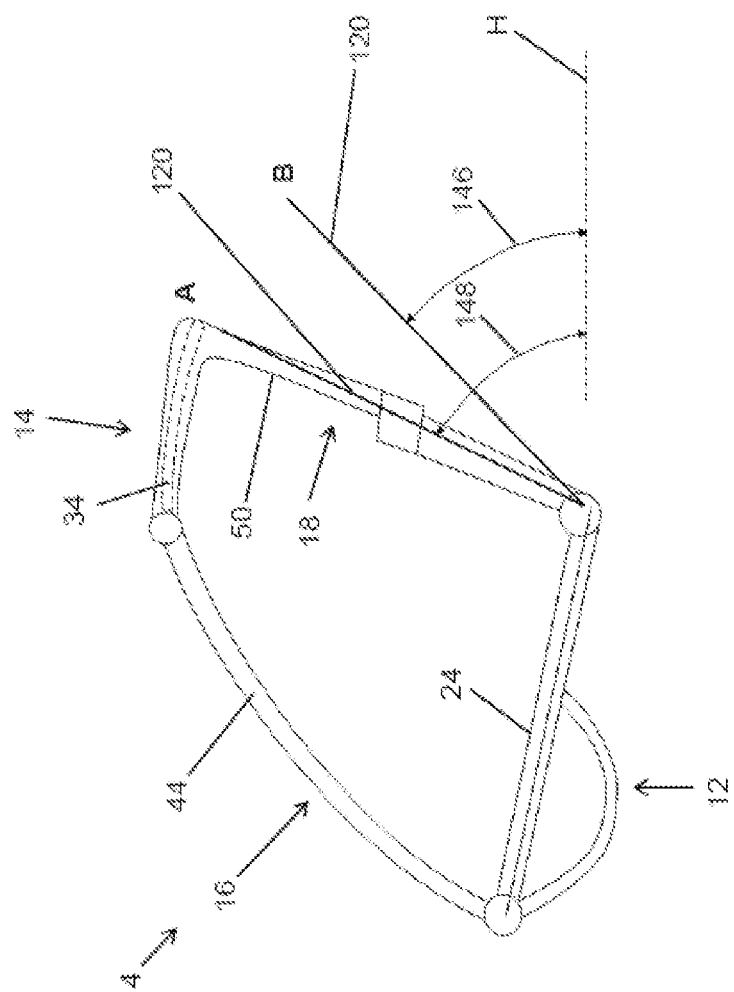
FIG. 14 is a schematic side view of a frame assembly illustrating a first, upright position and a second, reclined position of an upper seat support according to an embodiment.

FIG. 14 schematically illustrates frame assembly 4, according to an embodiment, in which upper seat support 20 is at the first seat position A, namely, the upright seat position, and at the second seat position B, namely, the relaxed seat position. In some embodiments, in which upper seat support 20 is at the first seat position A, an angle 146 between seat back 120 and a horizontal plane H ranges from about 50 degrees to about 80 degrees. In some embodiments, angle 146 ranges from about 60 degrees to about 70 degrees. In some embodiments, angle 146 is about 65 degrees. In some embodiments, in which upper seat support 20 is at the second seat position B, an angle 148 between seat back 120 and horizontal plane H ranges from about 30 degrees to about 60 degrees. In some embodiments, angle 148 ranges from about 40 degrees to about 50 degrees. In some embodiments, angle 148 is about 45 degrees. In some embodiments, the difference between angle 146 and angle 148 ranges from about 10 degrees to about 30 degrees. In some embodiments, the difference between angle 146 and angle 148 ranges from about 15 degrees to about 25 degrees. In some embodiments, the difference between angle 146 and angle 148 ranges is about 20 degrees.

Figure 15:
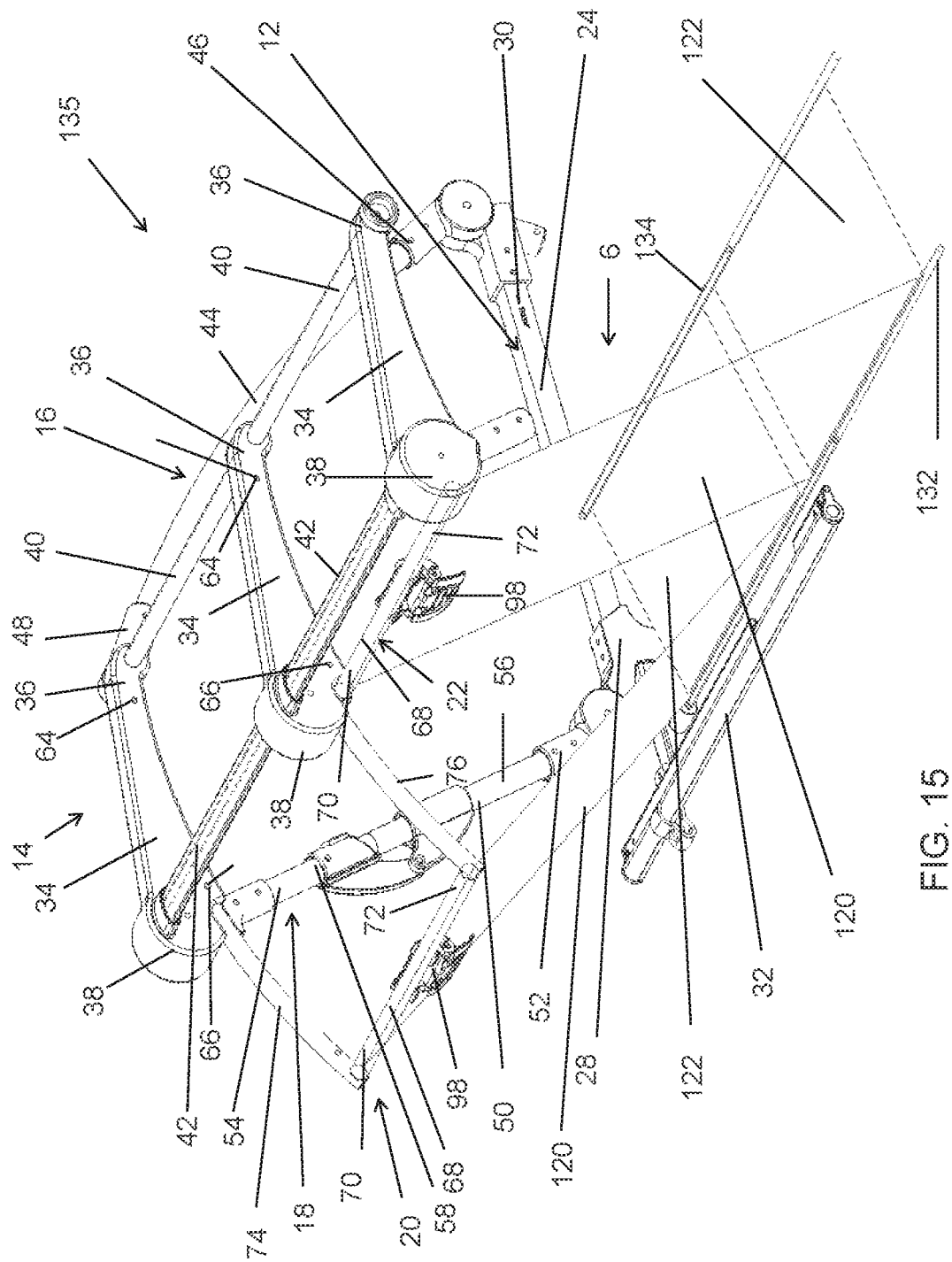
FIG. 15 is a partial rear perspective view of a frame assembly of a passenger transport carrier having a plurality of seats according to an embodiment.

FIG. 15 illustrates a frame assembly 135 according to another embodiment. As shown in FIG. 15, frame assembly 135 is configured to transport a plurality of passengers within compartment 6 using a plurality of seats. Frame assembly 135 is substantially similar to frame assembly 4 illustrated in FIGS. 1-13, and FIG. 15 uses like reference numbers to generally indicate identical, functionally similar, and/or structurally similar elements. These similar components are only discussed to the extent they may differ from the components of frame assembly 4 or needed to describe the embodiment. Here, upper frame 14 of frame assembly 135 includes at least three spaced apart elongate upper frame members 34 that extend longitudinally across frame assembly 135. The two outer upper frame members 34 each define a single channel 62, and the middle upper frame member 34 defines two channels 62. Each of these channels has an opening at rear end 38 of frame members 34 of upper frame 14, and has closed ends at forward ends 36 of frame members 34.

Frame assembly 135 includes a first upper seat support 20 movably coupled to upper frame 14 and a second upper seat support 22 movably coupled to upper frame 14. Second upper seat support 22 is configured to move independently from first upper seat support 20. Second upper seat support 22 can be constructed similarly to first upper seat support 20 described above.

The channel defined by the left upper frame members 34 of upper frame 14 and one of the channels defined by the middle upper frame member 34 can be configured to closely receive elongate members 74 and 76 of first upper seat support 22 therein. The other channel defined by the middle upper frame member 34 of upper frame 14 and the channel defined by the right upper frame member 34 can be configured to closely receive elongate members 74 and 76 (which are enclosed within the middle upper frame member 34 and the right upper frame member 34 in FIG. 15) of second upper seat support 22 therein. Elongate members 74 and 76 of first seat support 20 slide within the channels of the left and middle upper frame members 34 as upper seat support 20 moves relative to frame members 34 between a first seat position and a second seat position. Elongate members 74 and 76 of second seat support 22 slide within the channels of the middle and right upper frame members 34 as upper seat support 22 moves relative to frame members 34 between a first seat position and a second seat position independent of first upper seat support 20. A separate seat including seat back 120 and seat bottom 122 is coupled to each of upper seat support 20 and second upper seat support 22.

Figure 16:
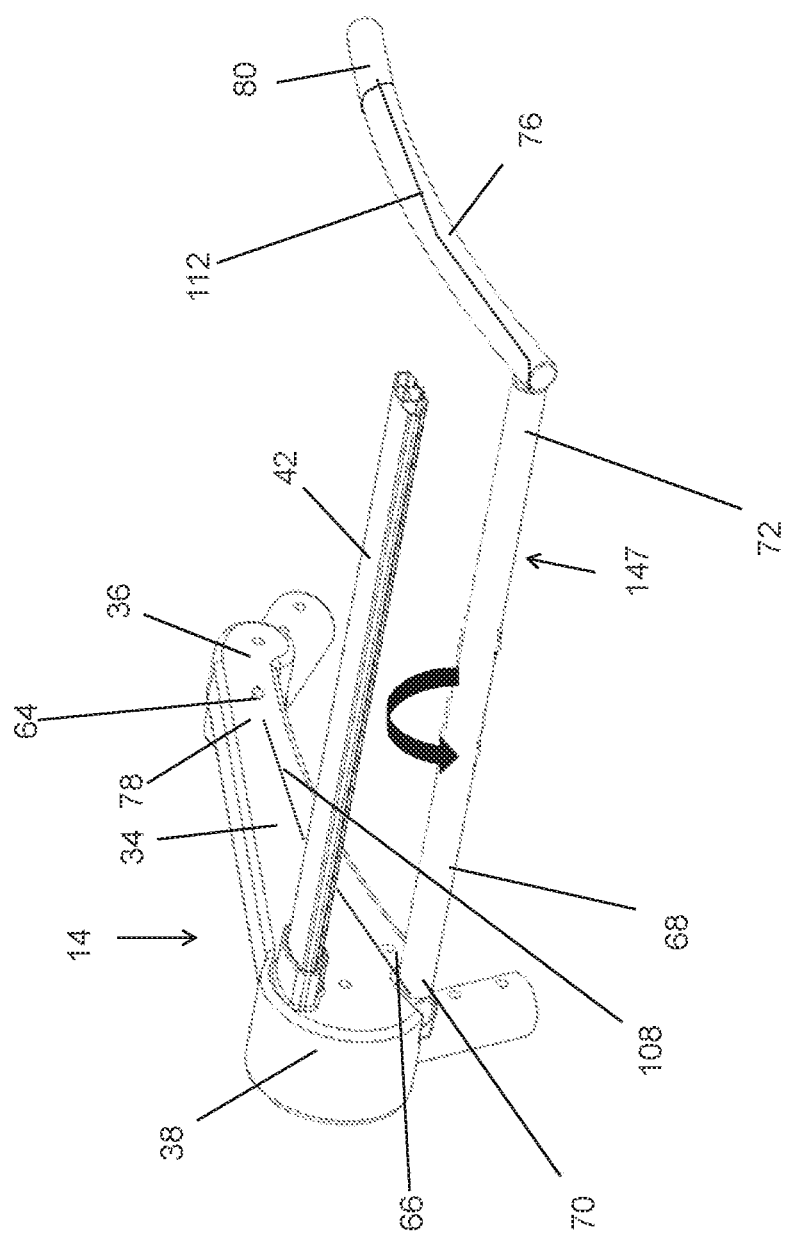
FIG. 16 is a partial rear perspective view of an upper frame portion, an upper seat support at a first, upright position, and an actuator according to an embodiment.

FIG. 16 illustrates another embodiment of an upper seat support 147. Upper seat support 147 is substantially similar to upper seat support 20 described above. Accordingly, FIG. 16 uses like reference numbers to generally indicate identical, functionally similar, and/or structurally similar elements. These similar components are only discussed to the extent they may differ from the components of upper seat support 20 or needed to describe the embodiment. In this embodiment, cross-member 68 is rotatably coupled to first elongate member 74 at first end 70 and rotatably coupled to second elongate member 76 at second end 72, and cross-member 68 forms a portion of the actuator configured to engage or disengage first lock 78 and second lock 80. End 110 of first cable 108 is fixedly coupled to cross-member 68, and end 114 of second cable 108 is fixedly coupled to cross-member 68. As cross-member 68 rotates, for example, in the direction indicated by the arrow in FIG. 16, cross-member 68 pulls first and second cables 108 and 112, which in turn pulls sliding members 88 of first lock 78 and second lock 80. As sliding members 88 of first and second locks 78 and 80 are pulled, the locking pin 82 of locks 78 and 80 moves from the first engaged pin position to the second disengaged pin position.

FIG. 17 illustrates another embodiment of an upper frame 150 and an upper seat support 136. Upper frame 150 and upper seat support 136 are substantially similar to upper frame 14 and upper seat support 20 described above. Accordingly, FIG. 17 uses like reference numbers to generally indicate identical, functionally similar, and/or structurally similar elements. These similar components are only discussed to the extent they may differ from the components of upper seat support 20 or needed to describe the embodiment. Upper seat support 136 includes a cross-member 138 that extends transversely across upper frame 14 of frame assembly 4 and carrier 2. Cross-member 138 is positioned to be accessible to a user's hand during use. Upper seat support 20 also includes a first elongate member 140 that extends longitudinally from an intermediate portion of cross-member 138 toward a front end of upper frame 150. In some embodiments, elongate member 140 is arcuate when viewed from the side. Collectively, when viewed from above in the vertical direction, upper seat support 136 has a T-shape. In other embodiments, elongate members 74 and 76 and cross-member 68 can form a non-T-shape. As shown in FIG. 17, transverse frame member 42 of upper frame 14 includes a portion 142 that projects downward from frame member 42. Projecting portion 142 defines a channel 144 configured to closely receive elongate member 140 therein. Elongate member 140 slides within channel 144 as upper seat support 136 is moved relative to upper frame 14 between the first seat position (not shown) and the second seat position (shown in FIG. 17).

Referencing FIGS. 1-13, operation of the frame assembly 4 according to an embodiment will now be described. To move upper seat support 20 from one seat position to another, for example, from the first seat position to the second seat position, a user places one hand on actuator 98. In some embodiments, the user places the other hand on either frame member 42 or handle 60 to secure carrier 2. In other embodiments, the user only uses one hand to operate frame assembly 4 to move upper seat support 20 from one seat position to another, namely, the hand operating actuator 98. The user then rotates lever 102 from the first lever position to the second lever position, which pulls first cable 108 and second cable 112, which in turn pulls sliding members 88 of first lock 78 and second lock 80 away from locking pin 82. As sliding members 88 are pulled away from locking pins 82 of first lock 78 and second lock 80, locking pins 82 move from (1) the first engaged pin position at which the distal ends of locking pins 82 are received within openings 64 defined by upper frame members 34 to (2) the second disengaged pin position at which the distal ends of locking pins 82 are no longer received within openings 64, disengaging first lock 78 and second lock 80 and unlocking upper seat support 20. With the hand that grabbed lever 102 of actuator 98, the user grabs upper seat support 20, while still holding frame member 42 or handle 60 with the other hand, and pulls upper seat support 20 to the second seat position. At the second seat position (if lever 102 is unobstructed), springs 94 push locking pins 82 of first lock 78 and second lock 80 from the second disengaged pin position to the first engaged pin position at which locking pins 82 are received within openings 66 defined by upper frame members 34, engaging first lock 78 and second lock 80 and locking upper seat support 20 at the second seat position.

To move upper seat support 20 from the second seat position to the first seat position, this process is repeated except that the user grabs upper seat support 20, while still holding frame member 42 or handle 60 with the other hand, and pushes upper seat support 20 to the first seat position. At the first seat position (if lever 102 is unobstructed), springs 94 push locking pins 82 of first lock 78 and second lock 80 from the second disengaged pin position to the first engaged pin position at which locking pins 82 are received within openings 64 defined by upper frame members 34, engaging first lock 78 and second lock 80 and locking upper seat support 20 at the first seat position.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A child transport carrier comprising:
   a lower frame having a first end and a second end;
   an upper frame having a first end and a second end;
   a rear frame extending from the second end of the lower frame to the second end of the upper frame; and
   a first upper seat support comprising:
      a cross-member extending transversely across the first upper seat support and having a first end and a second end,
      wherein the cross-member is configured to move the first upper seat support between a first seat position and a second seat position,
      wherein the upper frame extends from an upper end of the rear frame and the lower frame extends from a lower end of the rear frame, and
      wherein the cross-member is configured to translate the first and second ends along first and second receiving members.

2. The carrier of claim 1, further comprising a first lock coupled to the first upper seat support and configured to lock the first upper seat support in the first seat position and in the second seat position.

3. The carrier of claim 2, wherein the first lock comprises a movable first locking pin.

4. The carrier of claim 3, wherein the upper frame defines a first opening configured to receive the movable first locking pin when the first upper seat support is at the first seat position and a second opening configured to receive the movable first locking pin when the first upper seat support is at the second seat position.

5. The carrier of claim 2, further comprising an actuator coupled to the first lock and configured to engage or disengage the first lock.

6. The carrier of claim 5, wherein the actuator is coupled to the cross-member.

7. The carrier of claim 6, wherein the actuator is positioned on the cross-member such that the actuator is accessible to lock or unlock the first upper seat support from a rear of the carrier.

8. The carrier of claim 7, wherein the first and second receiving members each define a channel configured to receive the first and second ends of the cross-member.

9. The carrier of claim 8, wherein the first and second ends of the cross-member are configured to slide within the channels of the first and second receiving members when the actuator disengages the first lock.

10. The carrier of claim 2, further comprising:
    a second lock coupled to the first upper seat support and configured to lock the first upper seat support in the first seat position and in the second seat position.

11. The carrier of claim 10, further comprising an actuator coupled to the first lock and to the second lock and configured to simultaneously engage or disengage the first lock and the second lock.

12. The carrier of claim 1, further comprising a second upper seat support adjacent the first upper seat support, the second upper seat support comprising:
    a cross-member extending transversely across the second upper seat support and having a first end and a second end,
    wherein the cross-member of the second upper seat support is configured to move the second upper seat support between a first seat position and a second seat position independent of the first upper seat support.

13. A child transport carrier comprising:
    a frame having a lower frame, an upper frame, and a rear frame that define a passenger compartment; and
    a first seat support comprising:
       a cross-member extending transversely across the first seat support and having a first end and a second end,
       wherein the cross-member is configured to move the first seat support between a first seat position and a second seat position,
       wherein the lower frame defines a lower boundary of the passenger compartment, the upper frame defines an upper boundary of the passenger compartment, and the rear frame defines a rear boundary of the passenger compartment, and
       wherein the cross-member is configured to translate the first and second ends along first and second receiving members.

14. The carrier of claim 13, further comprising:
    a first lock coupled to the first seat support and configured to lock the first seat support in the first seat position and in the second seat position; and an actuator coupled to the first lock and the cross-member and configured to engage or disengage the first lock.

15. The carrier of claim 13, wherein the first and second receiving members each define a channel configured to receive the first and second ends of the cross-member.

16. A transport carrier comprising:
a frame defining a passenger compartment;
a first seat support coupled to the passenger compartment, the first seat support comprising:
a first cross-member extending transversely across the first seat support and having a first end and a second end; and
a second seat support adjacent the first seat support and coupled to the passenger compartment, the second seat support comprising:
a second cross-member extending transversely across the second seat support and having a first end and a second end,
wherein the first cross-member is configured to move the first seat support between a first seat position and a second seat position,
wherein the second cross-member is configured to move the second seat support between a first seat position and a second seat position independent of the first seat support,
wherein the first cross-member is configured to translate the first and second ends of the first cross-member along first and second receiving members, and
wherein the second cross-member is configured to translate the first and seconds ends of the second cross-member along third and fourth receiving members.

17. The carrier of claim 16, wherein:
the first and second receiving members define first and second channels configured to receive the first and second ends of the first cross-member; and
the third and fourth receiving members define third and fourth channels configured to receive the first and second ends of the second cross-member.

18. The carrier of claim 17, wherein:
the first and second ends of the first cross-member are configured to slide within the first and second channels when a first actuator coupled to the first cross-member is actuated; and
the first and second ends of the second cross-member are configured to slide within the third and fourth channels when a second actuator coupled to the second cross-member is actuated.

* * * * *